United States Patent [19]
Kato et al.

[11] Patent Number: 5,140,083
[45] Date of Patent: Aug. 18, 1992

[54] MALEIMIDE COPOLYMER AND PROCESS FOR PREPARING SAME

[75] Inventors: Kenji Kato; Yasumi Koinuma; Kazunori Doiuchi; Seigo Kinoshita; Yukinori Haruta, all of Oita, Japan

[73] Assignee: Nippon Oil and Fats Co., Ltd., Tokyo, Japan

[21] Appl. No.: 456,352

[22] Filed: Dec. 26, 1989

[30] Foreign Application Priority Data

Dec. 27, 1988 [JP] Japan ................................. 63-327980
Jan. 17, 1989 [JP] Japan ....................................... 1-5949
Jan. 18, 1989 [JP] Japan ....................................... 1-8980
Apr. 7, 1989 [JP] Japan ..................................... 1-86995

[51] Int. Cl.⁵ .................... C08F 222/40; C08F 122/40; C08F 22/40
[52] U.S. Cl. ................................ 526/262; 526/230.5; 526/232; 526/232.5
[58] Field of Search ..................... 526/262, 230.5, 232, 526/232.5

[56] References Cited

U.S. PATENT DOCUMENTS 4,658,001  4/1987  Kato et al. ........................... 526/232
5,064,921 11/1991  Blum et al. ........................... 526/262
5,089,576  2/1992  Tsuji et al. ........................... 526/232

FOREIGN PATENT DOCUMENTS 1095011  5/1986  Japan .
1029998  5/1966  United Kingdom .

Primary Examiner—Paul R. Michl
Assistant Examiner—Tae H. Yoon
Attorney, Agent, or Firm—Malcolm B. Wittenberg

[57] ABSTRACT

A maleimide random copolymer contains an N-substituted compound structural unit, an unsaturated peroxycarbonate structural unit and optionally a vinyl monomer structural unit. In place of the unsaturated peroxycarbonate structural unit, an unsaturated peroxyester unit may be contained. A process for preparing a maleimide graft copolymer comprises polymerizing a mixture of an N-substituted maleimide compound and a vinyl monomer in the presence of a random vinyl copolymer containing peroxy groups with active oxygen content.

5 Claims, 4 Drawing Sheets

MALEIMIDE COPOLYMER AND PROCESS FOR PREPARING SAME

BACKGROUND OF THE INVENTION

This invention relates to a maleimide copolymer and a process for preparing the same.

There are known a variety of peroxy group-containing copolymers in the art. For example, there are known a copolymer of t-butyl peroxy methacrylate and methyl methacrylate in British Patent No. 1041088; a copolymer of t-butyl peroxyallyl carbonate with vinyl chloride in Japanese Patent Publication No.42083/1982; and a peroxycarbonate group-containing copolymer in Japanese Laid-open Patent Application No. 91209/1986.

However, in none of the above mentioned Publications, mention is made of a copolymer of a maleimide compound, an unsaturated peroxyester residue and a vinyl monomer.

On the other hand, it has been known to copolymerize the maleimide compound with various vinyl monomers to improve its thermal properties. For example, there are shown a copolymer of methyl methacrylate with an aryl maleimide in Japanese Patent Publication No. 9753/1968 and a copolymer of vinyl chloride and a maleimide compound in Japanese Patent Publication No. 12433/1969, both of these copolymers exhibiting high thermal resistance.

However, these copolymers has a disadvantage in that moldability and impact resistance are markedly lowered with increase in the ratio of the maleimide compound such that it is difficult to produce a copolymer having balanced properties.

On the other hand, as the process for preparing a graft copolymer of a vinyl monomer, there is proposed in Japanese Patent Publication No. 45647/1986 a process for preparing a graft copolymer comprising polymerizing a vinyl monomer in the presence of a peroxy group-containing copolymer by cleavage of the peroxy group.

However, there are not known in the art a graft copolymer of the maleimide compound and a process for preparing the graft copolymer.

SUMMARY OF THE INVENTION

It is a principal object of the present invention to provide a maleimide random copolymer which is easy to handle, superior in thermal resistance, safety and storage stability and useful as an intermediate product for the maleimide graft copolymer.

It is another object of the present invention to provide a maleimide random copolymer which is useful as a modifier for high polymeric materials.

It is a further object of the present invention to provide a process for preparing a maleimide graft copolymer which is easy to handle and to control molecular weight and compositions of polymer chains and which is highly useful for industrial application.

It is a further object of the present invention to provide a process for preparing a maleimide graft copolymer with high graft efficiency and at high yield.

It is yet another object of the present invention to provide a process for preparing a maleimide graft copolymer which is useful as a molding material.

According to the present invention, there is provided a maleimide random copolymer having a number average molecular weight of 1,700 to 530,000 comprising:

99.9 to 80 wt.% of a structural unit of a maleimide compound represented by the formula (I)

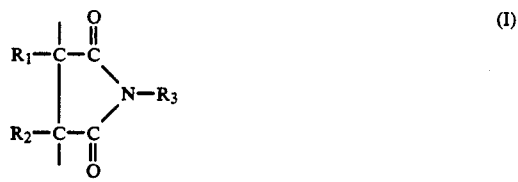

wherein $R_1$ and $R_2$ each stand for a hydrogen atom, a halogen atom or a methyl group and $R_3$ stands for an alkyl group having 1 to 18 carbon atoms, a halogen-substituted alkyl group having 1 to 18 carbon atoms, a cycloalkyl group, an aryl group or a substituted aryl group; and 0.1 to 20 wt. % of a structural unit of an unsaturated peroxycarbonate represented by the formula (II)

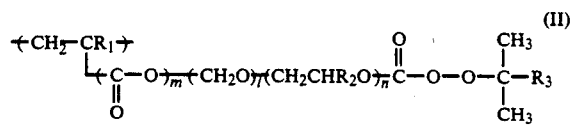

wherein $R_1$ and $R_2$ each stand for a hydrogen atom or a methyl group and $R_3$ stands for an alkyl group having 1 to 12 carbon atoms, a phenyl group, an alkyl-substituted phenyl group or a cycloalkyl group having 3 to 12 carbon atoms, m and l being 0 or 1, m+l=1 and n being an integer of 0 to 2.

According to the present invention, there is also provided a maleimide random copolymer having a weight average molecular weight of 2,000 to 600,000 comprising:

20 to 99 wt. % of a structural unit of a maleimide compound represented by the formula (I)

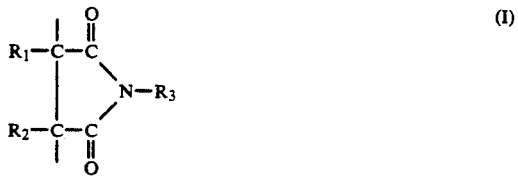

wherein $R_1$ and $R_2$ each stand for a hydrogen atom, a halogen atom or a methyl group and $R_3$ stands for an alkyl group having 1 to 18 carbon atoms, a halogen-substituted alkyl group having 1 to 18 carbon atoms, a cycloalkyl group, an aryl group or a substituted aryl group;

0.1 to 20 wt. % of a structural unit of an unsaturated peroxycarbonate represented by the formula (II)

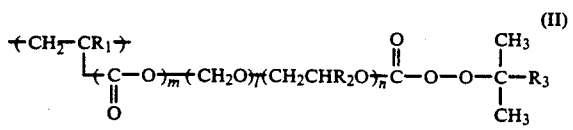

wherein $R_1$ and $R_2$ each stand for a hydrogen atom or a methyl group and $R_3$ stands for an alkyl group having 1 to 12 carbon atoms, a phenyl group, an alkyl-substituted phenyl group or a cycloalkyl group having 3 to 12 carbon atoms; m and l being 0 or 1, m+l=1 and n being an integer of 0 to 2; and 0.5 to 79 wt. % of a structural unit of a vinyl monomer represented by the formula (III)

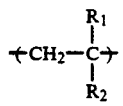

wherein $R_1$ stands for a hydrogen atom, a halogen atom or a methyl group and $R_2$ stands for an alkyl group, a phenyl group, an alkyl-substituted phenyl group, a halogen-substituted phenyl group, a chlorine atom, a nitrile group,

or $-COOR_4$, $R_3$ and $R_4$ each being an alkyl group having 1 to 18 carbon atoms.

According to the present invention, there is also provided a maleimide random copolymer having a weight average molecular weight of 2,000 to 600,000 comprising:

99.9 to 80 wt. % of a structural unit of a maleimide compound represented by the formula (I)

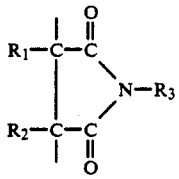

wherein $R_1$ and $R_2$ each stand for a hydrogen atom, a halogen atom or a methyl group and $R_3$ stands for an alkyl group having 1 to 18 carbon atoms, a halogen-substituted alkyl group having 1 to 18 carbon atoms, a cycloalkyl group, an aryl group or a substituted aryl group; and 0.1 to 20 wt. % of a structural unit of an unsaturated peroxyester represented by the formula (IV)

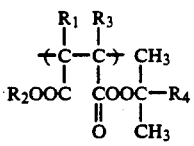

wherein $R_1$ and $R_3$ each stand for a hydrogen atom or a methyl group, $R_2$ stands for an alkyl group having 1 to 6 carbon atoms and $R_4$ stands for an alkyl group having 1 to 5 carbon atoms, a phenyl group or an alkyl-substituted phenyl group.

According to the present invention, there is also provided a maleimide random copolymer having a weight average molecular weight of 2,000 to 600,000 comprising:

30 to 90 wt. % of a structural unit of a maleimide compound represented by the formula (I)

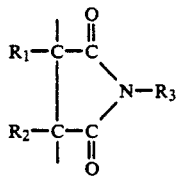

wherein $R_1$ and $R_2$ each stand for a hydrogen atom, a halogen atom or a methyl group and $R_3$ stands for an alkyl group having 1 to 18 carbon atoms, a halogen-substituted alkyl group having 1 to 18 carbon atoms, a cycloalkyl group, an aryl group or a substituted aryl group;

0.1 to 20 wt. % of a structural unit of an unsaturated peroxyester represented by the formula (IV)

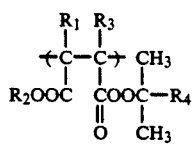

wherein $R_1$ and $R_3$ each stand for a hydrogen atom or a methyl group, $R_2$ stands for an alkyl group having 1 to 6 carbon atoms and $R_4$ stands for an alkyl group having 1 to 5 carbon atoms, a phenyl group or an alkyl-substituted phenyl group; and 5 to 65 wt. % of a structural unit of a vinyl monomer represented by the formula (III)

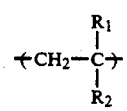

wherein $R_1$ stands for a hydrogen atom, a halogen atom or a methyl group and $R_2$ stands for an alkyl group, a phenyl group, an alkyl-substituted phenyl group, a halogen-substituted phenyl group, a chlorine atom, a nitrile group,

or $-COOR_4$, $R_3$ and $R_4$ each being an alkyl group having 1 to 18 carbon atoms.

According to the present invention, there is also provided a process for preparing a maleimide graft copolymer comprising polymerizing, in the presence of 100 parts by weight of a random vinyl copolymer containing peroxy groups with active oxygen content of 0.01 to 2.0%, 10 to 500 parts by weight of a mixture of 5 to 95 wt. % of a maleimide compound represented by the formula (I')

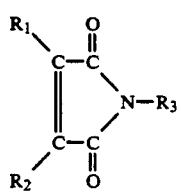

wherein $R_1$ and $R_2$ each stand for a hydrogen atom, a halogen atom or a methyl group and $R_3$ stands for an alkyl group having 1 to 18 carbon atoms, a halogen-substituted alkyl group having 1 to 18 carbon atoms, a cycloalkyl group, an aryl group or a substituted aryl group; and 95 to 5 wt. % of a vinyl monomer represented by the formula (III')

$$CH_2=CR_1R_2 \qquad (III')$$

wherein $R_1$ stands for a hydrogen atom, a halogen atom or a methyl group, $R_2$ stands for an alkyl group, a phenyl group, an alkyl-substituted phenyl group, a halogen-substituted phenyl group, a chlorine atom, a nitrile group,

or $-COOR_4$, $R_3$ and $R_4$ each being an alkyl group having 1 to 18 carbon atoms.

PREFERRED EMBODIMENTS OF THE INVENTION

Figure 1:
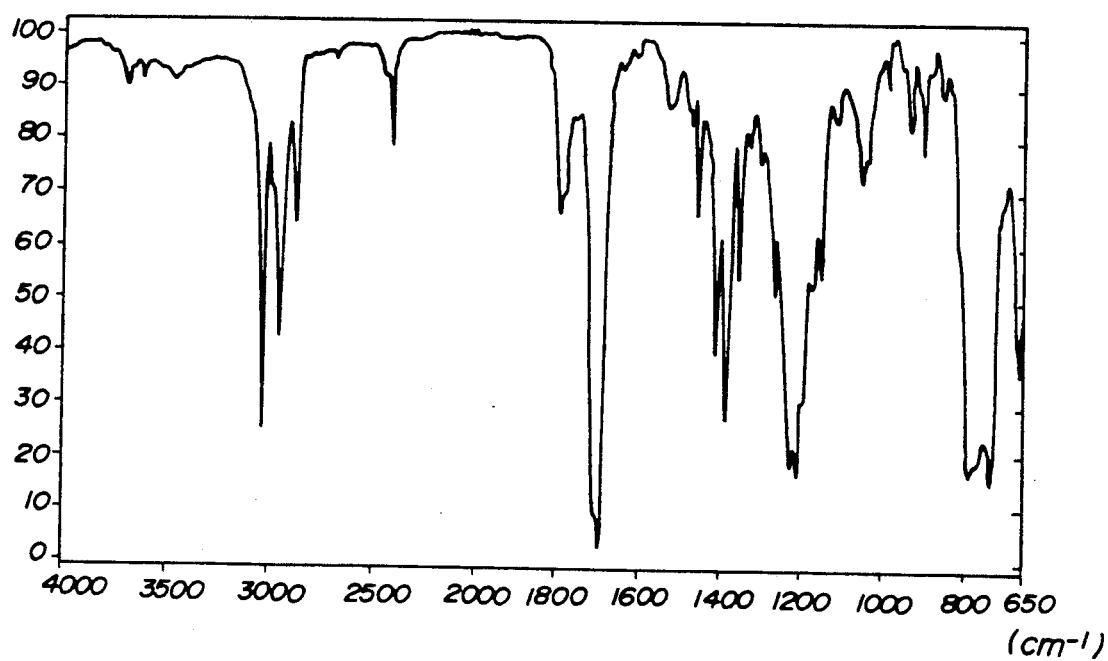
FIG. 1 is a chart showing an infrared absorption spectrum of a maleimide random copolymer prepared in Example 1—1.

The maleimide random copolymer of the present invention includes a maleimide structural unit having the following formula (I)

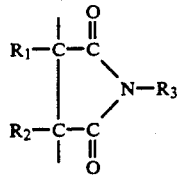

wherein $R_1$ and $R_2$ each stand for a hydrogen atom, a halogen atom or a methyl group, and $R_3$ stands for an alkyl group having 1 to 18 carbon atoms, a halogen-substituted alkyl group having 1 to 18 carbon atoms, a cycloalkyl group, an aryl group or a substituted aryl group. If $R_3$ is an alkyl group or halogen-substituted alkyl group having 19 or more carbon atoms, manufacture becomes prohibitively difficult. Monomers of the structural unit of the maleimide compound represented by the formula (I) may preferably include, for example, N-methyl maleimide, N-ethyl maleimide, N-n-propyl maleimide, N-i-propyl maleimide, N-t-butyl maleimide, N-dodecyl maleimide, N-octadecyl maleimide, N-phenyl maleimide, N-o-methylphenyl maleimide, N-p-isopropyl phenyl maleimide, N-phenyl-α-methyl maleimide, N-phenyl-α-chloromaleimide, N-cyclohexyl maleimide and N-benzyl maleimide.

The maleimide random copolymer of the present invention also includes a structural unit of an unsaturated peroxy carbonate having the formula (II)

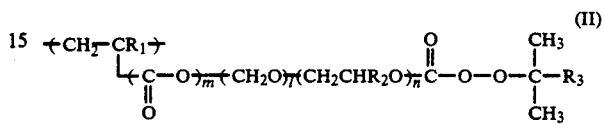

wherein $R_1$ and $R_2$ each stand for a hydrogen atom or a methyl group and $R_3$ stands for an alkyl group having 1 to 12 carbon atoms, a phenyl group, an alkyl-substituted phenyl group or a cycloalkyl group having 3 to 12 carbon atoms. Also, in the formula, m and l are 0 or 1, $m+l=1$ and n is an integer of 0 to 2. If $R_3$ is an alkyl or cycloalkyl group having 13 or more carbon atoms, manufacture becomes prohibitively difficult. Monomers of the structural unit of the unsaturated peroxy carbonate represented by the formula (II) may preferably include, for example, t-butylperoxyallyl carbonate, t-hexylperoxyallyl carbonate, 1,1,3,3-tetramethylbutylperoxyallyl carbonate,
p-menthaneperoxyallyl carbonate, cumylperoxyallyl carbonate,
t-butylperoxymethallyl carbonate,
t-butylperoxyacryloyloxyethyl carbonate,
t-hexylperoxyacryloyloxyethyl carbonate,
t-hexylperoxymethacryloyloxyethyl carbonate,
cumylperoxyacryloyloxyethyl carbonate,
p-isopropylcumylperoxyacryloyloxyethyl carbonate,
t-butylperoxymethacryloyloxyethyl carbonate,
t-butylperoxymethacryloyloxyethyl carbonate, t-amylperoxyacryloyloxyethyl carbonate, t-amylperoxymethacryloyloxyethyl carbonate, cumylperoxymethacryloyloxyethyl carbonate, t-butylperoxyacryloyloxyethoxyethyl carbonate, and t-hexylperoxyacryloyloxyethoxyethyl carbonate. These unsaturated peroxy carbonates exhibit high copolymerizability with the maleimide compound and high polymerization initiation efficiency and may exist stably in the produced copolymer.

The maleimide random copolymer of the present invention also includes a structural unit of a vinyl monomer according to the formula (III)

wherein $R_1$ stands for a hydrogen atom, a halogen atom or a methyl group and $R_2$ stands for an alkyl group, a phenyl group, an alkyl-substituted phenyl group, a halogen-substituted phenyl group, a chlorine atom, a nitrile group,

or —COOR$_4$, R$_3$ and R$_4$ each being an alkyl group having 1 to 18 carbon atoms. If R$_3$ and R$_4$ denote an alkyl group having 19 or more carbon atoms, manufacture becomes prohibitively difficult. Monomers of the vinyl monomer structural unit represented by the formula (III) may be enumerated, for example by styrene and derivatives thereof, acrylic acid and esters thereof, methacrylic acid and esters thereof, vinyl esters, halogenated vinyl and halogenated vinylidene. More specifically, the above monomers may include, for example styrene, o-methylstyrene, p-methylstyrene, o-chlorostyrene, p-bromostyrene, p-methoxystyrene, α-methylstyrene, acrylic acid, ethyl acrylate, n-butyl acrylate, phenyl acrylate, cyclohexyl acrylate, methacrylic acid, methyl methacrylate, ethyl methacrylate, n-butyl methacrylate, 2-ethylhexyl methacrylate, vinyl acetate, vinyl propionate, vinyl stearate, vinyl benzoate, vinyl chloride, acrylonitrile, methacrylonitrile, vinylidene chloride, butadiene, propylene, isoprene, ethylene and propionic acid. These may be included alone or as a mixture.

The maleimide random copolymer of the present invention also includes a structural unit of the unsaturated peroxyester represented by the formula (IV)

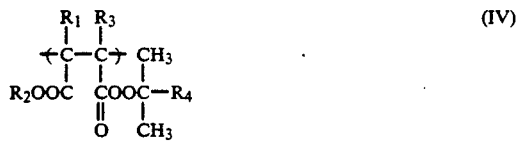

wherein R$_1$ and R$_3$ each stand for a hydrogen atom or a methyl group, R$_2$ stands for an alkyl group having 1 to 6 carbon atoms and R$_4$ stands for an alkyl group having 1 to 5 carbon atoms, a phenyl group or an alkyl-substituted phenyl group. If R$_2$ has 7 or more carbon atoms or R$_4$ has 6 or more carbon atoms, manufacture becomes prohibitively difficult. Monomers of the structural unit of the unsaturated peroxyester represented by the formula (IV) may preferably be enumerated, for example by t-butyl peroxy (meth)acrylate, t-amyl peroxy (meth)acrylate, t-hexyl peroxy (meth)acrylate, cumyl peroxy (meth)acrylate, t-butyl peroxy methyl fumarate, t-butyl peroxy isopropyl fumarate, t-amyl peroxy fumarate, t-hexyl peroxy methyl fumarate, cumyl peroxy methyl fumarate, t-butyl peroxy methyl fumarate, t-butyl peroxy methyl itaconate and t-butyl peroxy isopropyl itaconate. These may be included alone or as a mixture. The unsaturated peroxyester monomers exhibit high copolymerizability with the maleimide compound and high polymerization initiating efficiency for peroxyesters and high stability in the produced copolymer.

The maleimide random copolymer of the present invention includes four types of the copolymers.

The compositional ratio of the maleimide compound structural unit of the formula (I) and the peroxycarbonate structural unit of the formula (II) in a first maleimide random copolymer is 99.9 to 80 wt. % of the structural unit of the maleimide compound to 0.1 to 20 wt. % of the structural unit of the peroxycarbonate. If the compositional ratio of the structural unit of the maleimide compound exceeds 99.9 wt. %, that is, if the structural unit of the peroxycarbonate is less than 0.1 wt. %, the compositional ratio of the peroxy carbonate structural unit is so low that copolymerization may occur only difficultly, such that a useful intermediate product for preparing the graft copolymer cannot be obtained. On the other hand, if the compositional ratio of the structural unit of the maleimide compound is lower than 80 wt. %, that is, if the compositional ratio of the structural unit of the peroxycarbonate exceeds 20 wt. %, the concentration of the structural unit of the peroxycarbonate becomes excessive to cause handling risk. The content of the structural unit of the maleimide compound may be determined by finding the total nitrogen content in the produced maleimide random copolymer by, for example, the Kjeldahl method, whereas the content of the structural unit of the peroxycarbonate may be determined by measuring the amount of active oxygen by, for example the iodometric method.

The first maleimide random copolymer of the present invention is a random copolymer of the structural unit of the maleimide compound and the structural unit of the peroxycarbonate, and has the number average molecular weight of 1,700 to 530,000. If the number average molecular weight is less than 1,700, the molecular weight is lowered and thermal resistance is undesirably lowered, whereas, if the number average molecular weight exceeds 530,000, solubility in solvents is also undesirably lowered. The number average molecular weight, which is defined in accordance with the present invention, is equivalent to the polystyrene viscosity average molecular weight, which in turn is within the range of the limiting viscosity number of 0.02 to 1.6. The limiting viscosity number may be converted into the polystyrene viscosity average molecular weight by the following formula $$[\eta] = K \cdot [Mv]$$

where K is a constant and $K \times 10^3 (100 \text{ ml/g}) = 0.0716$; $\alpha = 0.76$ is a value for polystyrene in a chloroform solution at 25° C. ("Polymer Handbook", second edition, IV-17, published by Wiley Interscience). Thus, the limiting viscosity number of 0.02 to 1.6 is equivalent to the number average molecular weight of 1,700 to 530,000.

According to the present invention, the limiting viscosity number, that is the number average molecular weight, may be extensively adjusted by addition of a molecular weight adjustment agents, such as alkyl mercaptan. The number average molecular weight of the produced maleimide random copolymer may be measured by, for example, gel permeation chromatography (GPC).

The compositional ratio of the above mentioned structural units in a second maleimide random copolymer of the present invention is in the range of 20 to 99 wt. % of the structural unit of the maleimide compound according to the formula (I), 0.1 to 20 wt. % of the structural unit of the unsaturated peroxycarbonate according to the formula (II) and 0.5 to 79 wt. % of the structural unit of a vinyl monomer according to the formula (III). If the compositional ratio of the structural unit of the maleimide compound is less than 20 wt. % and the compositional ratio of the structural unit of the vinyl monomer exceeds 79 wt. %, the thermal resistance characteristic of the maleimide compound cannot be developed during preparation of a graft copolymer. If the compositional ratio of the structural unit of the maleimide compound exceeds 99 wt. % and that of the structural unit of the unsaturated peroxycarbonate is less than 0.1 wt. %, the produced copolymer cannot be utilized as an intermediate product for preparing a graft copolymer because of the less content of the structural unit of the peroxycarbonate in the produced copolymer. On the other hand, if the compositional ratio of the structural unit of the unsaturated peroxycarbonate exceeds 20 wt. %, handling may be endangered because of the excessive content of the structural unit of the peroxycarbonate. Therefore, the compositional ratio of each structural unit should be in the above mentioned range.

In a third maleimide random copolymer of the present invention, the structural unit of the maleimide compound of the formula (I) accounts for 80 to 99.9 wt. % and the structural unit of the unsaturated peroxyester of the formula (IV) accouts for 0.1 to 20 wt. %. If the ratio of the structural unit of the maleimide compound exceeds 99.9 wt. %, that is, if the structural unit of the unsaturated peroxyester is less than 0.1 wt. %, the ratio of the unsaturated peroxyester structural unit in the produced copolymer is so low that a useful intermediate product for preparing a graft copolymer cannot be obtained. On the other hand, if the ratio of the structural unit of the maleimide compound is less than 80 wt. %, that is, if the ratio of the structural unit of the unsaturated peroxyester exceeds 20 wt. %, the amount of the structural unit of the unsaturated peroxyester in the copolymer is so large that handling may be endangered.

The weight average molecular weight of the third maleimide random copolymer of the present invention is in the range of from 2,000 to 600,000. If the weight average molecular weight is less than 2,000, the thermal resistance is lowered, whereas, if it exceeds 600,000, the produced copolymer is acutely lowered in solubility in solvents, so that the copolymer is not acceptable as an intermediate product for preparing the graft copolymer. The weight average molecular weight may be extensively adjusted by the addition, during polymerization, of a molecular weight adjustment agent, such as dodecyl mercaptan.

In a fourth maleimide random copolymer of the present invention, the structural unit of the maleimide compound of the formula (I) accounts for 30 to 90 wt. %, the structural unit of the unsaturated peroxyester of the formula (IV) accounts for 0.1 to 20 wt. % and the structural unit of the vinyl monomer of the formula (III) accounts for 5 to 65 wt. %, the total of each unit being 100 wt. %. If the ratio of the structural unit of the maleimide compound is less than 30 wt. % or the ratio of the structural unit of the vinyl monomer exceeds 65 wt. %, the high thermal resistance characteristic of the maleimide compound cannot be developed during preparation of a graft copolymer. On the other hand, if the ratio of the structural unit of the maleimide compound exceeds 90 wt. % or the ratio of the structural unit of the unsaturated peroxyester is less than 0.1 wt. %, the ratio of the structural unit of the unsaturated peroxyester in the produced copolymer is so low that a useful intermediate product for preparing a graft copolymer cannot be obtained. Furthermore, if the ratio of the structural unit of the unsaturated peroxyester exceeds 20 wt. %, the ratio of the unsaturated peroxyester structural unit in the produced copolymer is so large as to endanger the handling.

The weight average molecular weight of the maleimide random copolymer of the present invention is in the range from 2,000 to 600,000. If the weight average molecular weight is less than 2,000, the produced copolymer is lowered in thermal resistance, whereas, if the weight average molecular weight exceeds 600,000, the produced copolymer is acutely lowered in solubility in solvents or vinyl monomers, so that the produced copolymer cannot be used as an intermediate product for preparing a graft copolymer. The weight average molecular weight may be extensively adjusted by the addition, during polymerization, of a molecular weight adjustment agent, such as dodecyl mercaptan.

For preparing the maleimide random copolymer of the present invention, the aforementioned monomers may be polymerized by known polymerization methods, such as bulk polymerization, solution polymerization, suspension polymerization or emulsion polymerization, in the presence of radical polymerization initiators, such as organic peroxides, azo compounds or inorganic compounds. The polymerization may be effected batchwise or continuously. The radical polymerization initiators may preferably be enumerated by, for example, benzoyl peroxide, lauryl peroxide, isobutyryl peroxide, acetyl cyclohexyl sulfonyl peroxide, t-butyl peroxy pivalate, cumyl peroxy neodecanoate, t-butyl peroxy benzoate, dicumyl peroxide, di-t-butyl peroxide, azobis isobutylnitrile, 2,2'-azobis(2,4-dimethylvaleronitrile), t-butyl hydroperoxide, cumene hydroperoxide, hydrogen peroxide, potassium persulfate and ammonium persulfate. The charged amount of the radical polymerization initiator is preferably 0.01 to 10 wt. % to the total charged monomers. If the amount is less than 0.01 wt. %, the polymerization reaction is markedly retarded, whereas, if the amount exceeds 10 wt. %, there arises the risk of runaway of the polymerization reaction. The polymerization temperature in the polymerization reaction may be 0° to 120° C., preferably 30° to 100° C., more preferably 40° to 70° C. If the polymerization temperature is lower than 0° C., the polymerization reaction is acutely retarded, whereas, if the temperature exceeds 120° C., the unsaturated peroxycarbonate structural unit or the unsaturated peroxyester structural unit in the copolymer is undesirably liable to decomposition.

In determining the chemical structure of the maleimide random copolymer of the present invention, the carbonyl groups of the maleimide compound residues or the unsaturated peroxyester residues in the copolymer may be identified by measuring the infrared absorption spectrum and the amount of active oxygen, while the compositional ratio in the copolymer may be determined by finding the nitrogen amount by the Kjeldahl method and the amount of active oxygen. The weight average molecular weight of the copolymer may be found by GPC method or the viscosity method.

In accordance with a process for preparing a maleimide graft copolymer of the present invention, a specified random vinyl copolymer is polymerized with a mixture of a specified maleimide compound and a specified vinyl monomer.

According to the present invention, the above mentioned random vinyl copolymer may be prepared by, for example, the methods describerd in Japanese Patent Publication No. 42083/1982 and Japanese Laid-open Patent Application No. 91209/1986. That is, the random vinyl copolymer may be prepared by polymerizing a copolymerizable peroxide and a vinyl monomer by block polymerization, solution polymerization, emulsion polymerization or suspension polymerization at a temperature at which the peroxy linkages in the copolymerizable peroxide are not decomposed, using the radical polymerization initiators.

The aforementioned copolymerizable peroxides may preferably be enumerated by, for example, unsaturated peroxycarbonates, such as t-butyl peroxyallyl carbonate, t-hexyl peroxyallyl carbonate, 1,1,3,3-tetramethylbutyl peroxyallyl carbonate, t-butyl peroxymethallyl carbonate, t-butyl peroxyacryloyloxyethyl carbonate, t-hexyl peroxyacryloyloxyethyl carbonate, cumyl peroxyacrylolloxyethyl carbonate, t-amyl peroxymethacryloyloxyethyl carbonate, cumyl peroxymethacryloyloxyethyl carbonate and t-butyl peroxymethacryloyloxyethoxyethyl carbonate; unsaturated peroxyesters, such as t-butyl peroxy methacrylate, t-hexyl peroxy methacrylate, t-butyl peroxy acrylate, cumyl peroxy acrylate, t-butyl peroxy crotonate, cumyl peroxy crotonate, di-t-butyl peroxy itaconate, di-t-butyl peroxy fumarate, di-t-hexyl peroxy maleate, t-butyl peroxymethyl fumarate, t-butyl peroxy-i-propyl fumarate and t-hexyl peroxyethyl fumarate; and unsaturated dialkyl peroxides, such as 3-hydroxy-4-t-butyl peroxybutene-1 and 3-hydroxy-4-cumyl peroxybutene-1.

The aforementioned vinyl monomer may be a vinyl monomer represented by the formula (III')

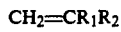  (III')

wherein $R_1$ stands for a hydrogen atom, a halogen atom or a methyl group and $R_2$ stands for an alkyl group, a phenyl group, an alkyl-substituted phenyl group, a halogen-substituted phenyl group, a chlorine atom, a nitrile group,

or $-COOR_4$, $R_3$ and $R_4$ each being an alkyl group having 1 to 18 carbon atoms. The vinyl monomer may be selected from a wide range of the compounds inclusive of both the conjugated and non-conjugated compounds. Specific examples of the vinyl monomers are not recited since they are the same as the aforementioned monomers of the vinyl monomer structural units of the formula (III) contained in the maleimide random copolymer of the present invention.

The above mentioned random vinyl copolymer containing peroxy groups, referred to hereinafter as the random copolymer, should contain peroxy groups with the amount of active oxygen in the range from 0.01 to 2.0%. If the amount of active oxygen is less than 0.01%, the concentration of the peroxy groups becomes so low that the capability for starting the graft copolymeriation is lowered. On the other hand, if the amount of active oxygen exceeds 2.0%, there arises the risk of the runaway of the polymerization reaction at the time of graft polymerization to raise handling difficulties. The amount of active oxygen in the random copolymer depends on the charging ratio of the peroxides copolymerizable with the vinyl monomer and the conversion ratio of the copolymerization reaction. That is, by mixing the vinyl monomer and the peroxide copolymerizable with the vinyl monomer at a mixing ratio such that the amount of active oxygen in the mixture is in the range of from 0.01 to 2.0%, and by completing the copolymerization reaction, it becomes possible to prepare the random copolymer having the peroxy groups with the above specified range of the amount of active oxygen. The amount of active oxygen in the random copolymer may be determined by an iodometric method, for example, by the method shown in "Chemistry of Organic Peroxides" by Yoshiro Ogata, published by Nankodo (1971), Japan.

The number average molecular weight of the random vinyl copolymer containing the peroxy groups is preferably in the range of from 1,000 to 300,000. If the number average molecular weight is less than 1,000, a star-shaped structure of the polymer is undesirably produced upon graft copolymerization. If the number average molecular weight of the random copolymer exceeds 300,000, dissolution or impregnation into the maleimide compound and vinyl monomer mixture undesirably becomes insufficient and non-homogeneous.

The maleimide compound employed in the present invention is represented by the formula (I')

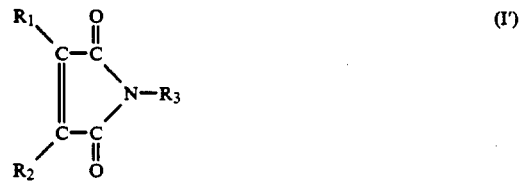

wherein $R_1$ and $R_2$ each stand for a hydrogen atom, a halogen atom or a methyl group and $R_3$ stands for an alkyl group having 1 to 18 carbon atoms, a halogen-substituted alkyl group having 1 to 18 carbon atoms, a cycloalkyl group, an aryl group or a substituted aryl group. Specific examples of the maleimide compound are not recited herein because they are the same as those of the above mentioned maleimide compound of the structural unit of the maleimide compound of the formula (I) contained in the maleimide random copolymer of the present invention.

The vinyl monomers copolymerizable with the maleimide compound in accordance with the present invention may be one or more selected from the vinyl monomers of the formula (III') employed in the preparation of the random copolymer.

The mixing ratio of a mixture of the maleimide compound and the vinyl monomer, graft-copolymerized in the presence of the random copolymer, is 5 to 95 wt. % of the maleimide compound and 95 to 5 wt. % of the vinyl monomer. If the amount of the maleimide compound is less than 5 wt. %, that is, if the amount of the vinyl monomer exceeds 95 wt. %, the ratio of the maleimide residues in the produced graft copolymer is so low that the thermal resistance cannot be expected to be improved, whereas, if the amount of the maleimide compound exceeds 95 wt. %, that is, if the amount of the vinyl monomer is less than 5 wt. %, the moldability or the impact resistance of the produced graft copolymer is lowered. Therefore, the mixing ratio should be in above mentioned range.

In accordance with the present invention, the amounts of the random copolymer and the mixture of the maleimide compound and the vinyl monomer, referred to hereinafter as the maleimide mixture, are 10 to 500 parts by weight of the maleimide mixture to 100 parts by weight of the random copolymer. If the amount of the maleimide mixture is less than 10 parts by weight, the thermal resistance is not seen to be improved, whereas, if the amount exceeds 500 parts by weight, the peroxy groups in the random copolymer result in problems, such as, a markedly retarded polymerization rate upon graft polymerization of the maleimide mixture, or failure in completing the polymerization.

In the process of the present invention, it suffices to polymerize the maleimide mixture by bulk polymerization, suspension polymerization or solution polymerization, in the presence of the random copolymer. More specifically, for example, the maleimide graft copolymer of the present invention may be produced by sufficiently impregnating, uniformly dispersing or dissolving the maleimide mixture forming the side chains of the graft copolymer in the random copolymer and polymerizing the resulting mass preferably for 2 to 20 hours at a polymerization temperature of 50° to 130° C. If the polymerization temperature is lower than 50° C., the rate of polymerization is markedly lowered, whereas, if the temperature exceeds 130° C., the peroxy groups in the random copolymer undesirably tend to be decomposed abruptly.

In connection with the chemical structure of the maleimide graft copolymer having the maleimide compound in the side chain, produced by the process according to the present invention, the ratio of each constituent monomer may be determined by the infrared absorption spectrum and by proton NMR, while the ratio of each monomer residue may also be determined by elementary analyses. The graft efficiency may be determined by separating the graft polymer and the copolymer by the extraction or fractional precipitation methods. On the other hand, the weight average molecular weight of the maleimide graft copolymer of the present invention may be determined by the GPC or limiting viscosity methods.

EXAMPLES OF THE INVENTION

The present invention will be explained in more detail with reference to the Reference Examples and Examples. These Examples, however, are not to be construed in the limiting sense.

REFERENCE EXAMPLE 1—1

Synthesis of Maleimide Compound

N-phenyl maleimide, abbreviated hereinafter to PMI, was synthesized in accordance with the method shown in Organic Synthesis, Vol. 41, page 93. That is, 196 g (2 mole) of maleic anhydride and 2.5 lit. of benzene were charged and dissolved in a three-neck flask having a 5 lit. capacity. Into the resulting solution were charged 186 g (2 mole) of aniline dissolved in 200 ml of benzene dropwise at room temperature over one hour. The resulting mass was cooled to 15° C., filtered and dried in vacuum to yield 370 g of crystals. The melting point of the crystals was 201° C.

Then, into a three-neck flask of 2 lit. capacity, fitted with a stirrer and a reflux cooler, 316 g of the above crystals, 65 g of a sodium salt of acetic anhydride and 670 ml of acetic anhydride were charged, and the charged mass was raised gradually in temperature and heated for 30 minutes over a steam bath. The resulting product was stirred continuously for one hour and poured into 1.3 lit. of ice water to precipitate the crystals. The precipitated crystals were washed with 500 ml of cold water and petroleum ether and dried to yield 220 g of yellow crystals. The melting point of the crystals was 88° C. After recrystallizing these crystals twice in cyclohexane, the melting point was 89.5° C. The molecular weight, the nitrogen content, the purity and the IR spectrum of the produced crystals were measured. The results are shown in Table 1—1.

REFERENCE EXAMPLES 1-2 TO 1-7

N-cyclohexyl maleimide (abbreviated hereinafter to CHMI), N-octadecyl maleimide (abbreviated hereinafter to ODMI), N-methyl maleimide (abbreviated hereinafter to MMI), N-benzyl maleimide (abbreviated hereinafter to BZMI), N-t-butyl maleimide (abbreviated hereinafter to TBMI) and N-2-methylphenyl maleimide (abbreviated hereinafter to PMMI) were prepared, respectively in the similar manner to Reference Example 1—1, and measurements were made of molecular weight, nitrogen content, purity and IR spectrum. The results are shown in Table 1—1.

TABLE 1-1

| Ref. Ex. | Maleimide Compound | Molecular Weight | Nitrogen Content (Theoretical Value, %) | Purity (wt. %) | IR Absorption Spectrum ($\nu c = 0$, $cm^{-1}$) |
|---|---|---|---|---|---|
| 1-1 | PMI | 173.17 | 8.09 | 98.6 | 1700 |
| 1-2 | CHMI | 179.22 | 7.82 | 99.2 | 1710 |
| 1-3 | ODMI | 349.56 | 4.01 | 94.6 | 1710 |
| 1-4 | MMI | 111.10 | 10.26 | 98.8 | 1712 |
| 1-5 | BZMI | 187.20 | 7.48 | 99.6 | 1712 |
| 1-6 | TBMI | 153.18 | 9.14 | 94.6 | 1710 |
| 1-7 | PMMI | 187.20 | 7.48 | 92.8 | 1700 |

REFERENCE EXAMPLE 1-8 SYNTHESIS OF PEROXYCARBONATE t-butyl peroxymethacryloyloxyethyl carbonate (abbreviated hereinafter to BPMC) was synthesized in accordance with USSR Patent No. 374,284. That is, into a four-neck flask of 1 lit. capacity, fitted with a stirrer, a thermometer and a dropping funnel, 336.6 g (1.2 mole) of a 20 wt. % aqueous solution of potassium hydroxide were charged, and then 154.5 g (1.2 mole) of a 70 wt. % aqueous solution of t-butylhydroperoxide were added at 20° C. Then, 207.1 g of methacryloyloxyethyl chloroformate of 93 wt. % purity were added dropwise at 20° C. for 30 minutes under vigorous agitation. The reaction system was continuously stirred for two hours. The reaction liquid was transferred to a separating funnel and freed of an aqueous phase and the organic phase was washed twice with 300 ml of cold water and dried over magnesium sulfate to yield 210.0 g of a transparent colorless liquid. Then, the purity of the produced liquid was found by calculation while the content of the active oxygen of the produced liquid was found by the iodometric method. The molecular weight and the IR absorption spectrum were measured simultaneously. The results are shown in Table 1-2.

REFERENCE EXAMPLES 1-9 AND 1-10 t-Butyl peroxyacryloyloxyethyl carbonate (abbreviated hereinafter to BPAC) and t-butyl peroxyallyl carbonate (abbreviated hereinafter to BPAL) were prepared, respectively in the similar manner to Reference Example 1-8, and measurements were made of the content of active oxygen, purity, molecular weight and IR absorption spectrum. The results are shown in Table 1-2.

TABLE 1-2

| Ref. Ex. | Peroxy-carbonate | Molecular Weight | Purity (wt. %) | IR Absorption Spectrum (v c = 0, cm$^{-1}$) | Active Oxygen Content (Theoretical Value, %) |
|---|---|---|---|---|---|
| 1-8 | BPMC | 246.5 | 96.0 | 1720 1790 | 6.50 |
| 1-9 | BPAC | 232.2 | 94.8 | 1725 1790 | 6.89 |
| 1-10 | BPAL | 176.4 | 93.6 | 1780 | 9.70 |

EXAMPLE 1—1

Into a four-neck flask of 1 lit. capacity, fitted with a stirrer, a thermometer, a Dimroth condenser, a nitrogen gas inlet duct and a dropping funnel, 400 ml of a 0.2 wt. % aqueous solution of polyvinyl alcohol (saponification degree of 89%) were charged, and the temperature of the aqueous solution was raised to 50° C. Then, 98.8 g of CHMI prepared in the Reference Example 1-2 and 2.1 g of BPMC prepared in the Reference Example 1-8 were dissolved in 100 ml of methylethylketone, simultaneously with diisopropyl peroxy dicarbonate which is a radical polymerization initiator (purity of 99 wt. %) and the resulting solution was added dropwise to the above aqueous solution at 50° C. for 10 minutes under introduction of a nitrogen gas. The resulting mass was stirred at 50° C. for 16 hours to produce a liquid suspension. Next, the produced white bead-like solid was filtered off, washed with water and dried in vacuum. The porduct weighed 88.6 g.

Figure 2:
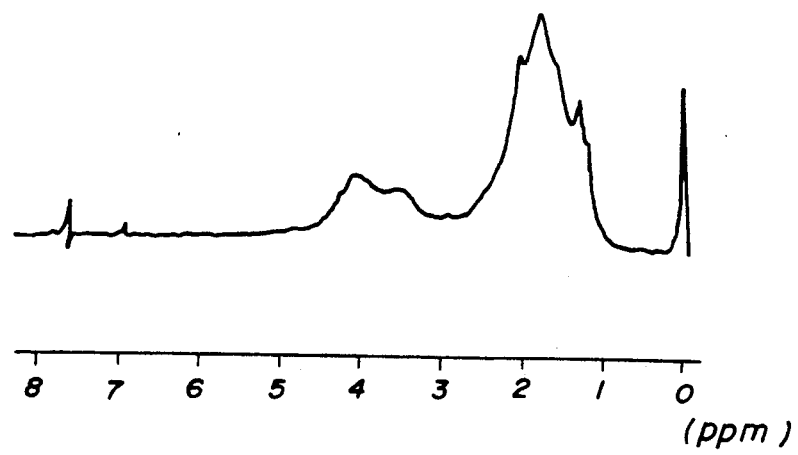
FIG. 2 is a chart showing $^1$H-NMR of the maleimide random copolymer prepared in Example 1—1.

After a fraction of the product was repeatedly dissolved and precipitated in a chloroform-methanol system and was washed, various measurements were conducted. Thus, the amount of active oxygen was found to be 0.13%, while absorption of the carbonyl groups of CHMI and BPMC in the copolymer was noticed by the IR absorption spectrum at 1700 cm$^{-1}$ and 1790 cm$^{-1}$, respectively. The amount of total nitrogen, as measured by the Kjeldahl analysis, was 7.7%, while the limiting viscosity number in the chloroform solution was 0.48 which was equivalent to the viscosity average molecular weight, calculated as polystyrene, equal to 108,000. From the above results, the produced white beads could be identified to be a random copolymer with the CHMI:BPMC ratio of 98.02:1.98. These results are shown in Table 3. The IR chart and the $^1$H-NMR chart of the produced beads are shown in FIGS. 1 and 2, respectively.

EXAMPLES 1-2 TO 1-7

Copolymerization was carried out in the same way as in Example 1-1 except using the maleimide compounds, peroxycarbonates, suspensions, solvents, radical polymerization initiators and molecular weight adjustment agents shown in Table 1-3, and modifying the copolymerization temperature and time shown in Table 1-3, and then analyses were conducted in the same way as in Example 1—1. The polymerization conditions and the results of analyses of the produced copolymers are shown in Table 1-3.

TABLE 1-3

| | Example | | | | | | |
|---|---|---|---|---|---|---|---|
| | 1-1 | 1-2 | 1-3 | 1-4 | 1-5 | 1-6 | 1-7 |
| Maleimide Compound | CHMI | PMI | TBMI | ODMI | BZMI | MMI | PMI |
| Purity (wt. %) | 99.2 | 98.6 | 94.6 | 94.6 | 99.6 | 98.8 | 98.6 |
| Charged Amount (g) | 98.2 | 96.3 | 105.6 | 104.7 | 90.4 | 101.1 | 81.1 |
| Peroxycarbonate | BPMC | BPAL | BPAC | DPAC | BPMC | BPMC | BPAC |
| Purity (wt. %) | 96.0 | 93.6 | 94.8 | 94.8 | 96.0 | 96.0 | 94.8 |
| Charged Amount (g) | 2.1 | 5.3 | 0.01 | 1.1 | 10.4 | 1.0 | 21.1 |
| Suspension *) | 0.2 wt. % Aqueous Solution of PVA | 0.15 wt. % Aqueous Solution of CMC | 0.1 wt. % Aqueous Solution of PANA | — | — | Water | Water |
| Charged Amount (ml) | 400 | 500 | 500 | — | — | 200 | 100 |
| Solvent | Methyl-ethylketone | Methyl-ethylketone | — | Tetrahydrofuran | Toluene | Isopropyl Alcohol | Ethanol 100 Isopropyl Alcohol 100 |
| Charged Amount (ml) | 100 | 100 | — | 400 | 500 | 200 | |
| Radical Polymerization Initiator **) | IPP | BPO | TBPV | IPP | TBPV | IPP | DIBP |
| Addition Amount (as Pure Product, wt. %, to Total Monomer) | 1.0 | 0.2 | 0.5 | 0.5 | 1.0 | 3.0 | 1.0 |
| Molecular Weight Modifier ***) | — | NDM | NDM | NDM | NDM | TDM | — |
| Charged Amount (g) | — | 0.1 | 0.2 | 0.2 | 0.2 | 1.0 | — |
| Copolymerization Temperature (°C.) | 50 | 80 | 70 | 50 | 70 | 70 | 40 |
| Copolymerization Time (hr) | 16 | 8 | 12 | 14 | 12 | 8 | 20 |
| Copolymer Yield (g) | 88.6 | 82.0 | 88.6 | 78.6 | 92.6 | 88.2 | 84.2 |
| Amount of Active Oxygen (%) | 0.13 | 0.45 | 0.02 | 0.07 | 0.52 | 0.01 | 1.51 |
| Total Nitrogen (%) | 7.7 | 7.69 | 9.15 | 3.97 | 8.41 | 10.25 | 6.31 |
| Limiting Viscosity Number (100 ml/g, 25° C., | 0.48 | 0.36 | 0.24 | 0.62 | 0.46 | 0.02 | 1.6 |

TABLE 1-3-continued

| | Example | | | | | | |
|---|---|---|---|---|---|---|---|
| | 1-1 | 1-2 | 1-3 | 1-4 | 1-5 | 1-6 | 1-7 |
| in Chloroform) | | | | | | | |

*) PVA; Polyvinyl Alcohol
CMC: Carboxymethyl Cellulose
PANA: Sodium Polyacrylate
**) IPP; Diisopropyl Peroxy Dicarbonate
BPO; Dibenzoyl Peroxide
TBPV: t-Butyl Peroxy Pivalate
DIBP; Diisobutyl Peroxide
***) NDM; n-Dodecylmercaptan
TDM; t-Dodecylmercaptan

EXAMPLE 2-1

Figure 3:
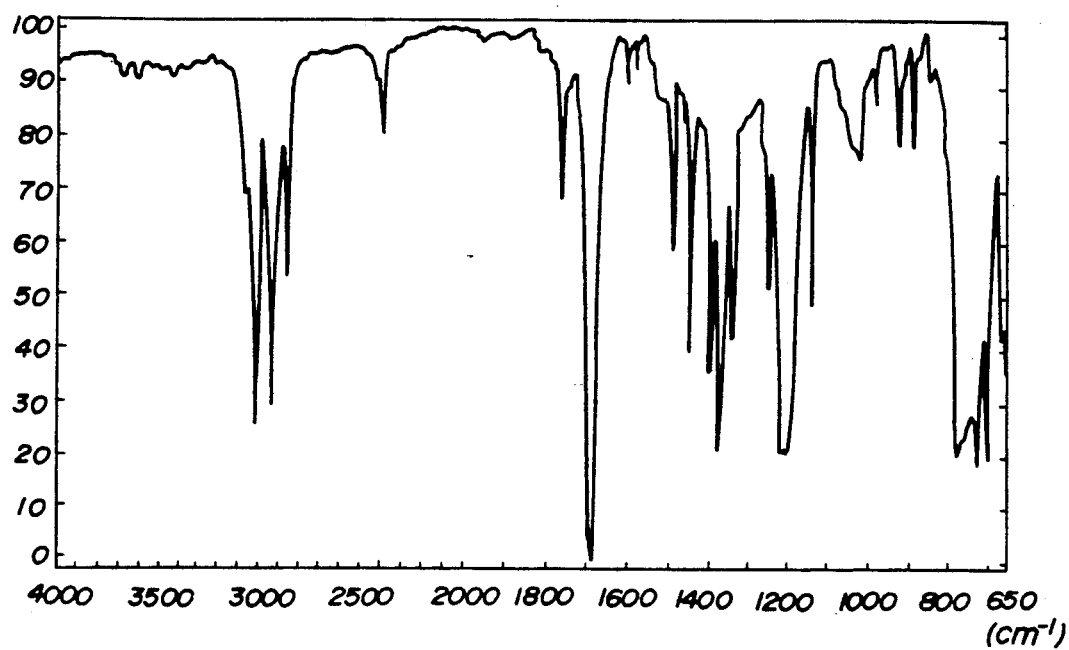
FIG. 3 is a chart showing an infrared absorption spectrum of a peroxy group-containing maleimide random copolymer prepared in Example 2-1.
Figure 4:
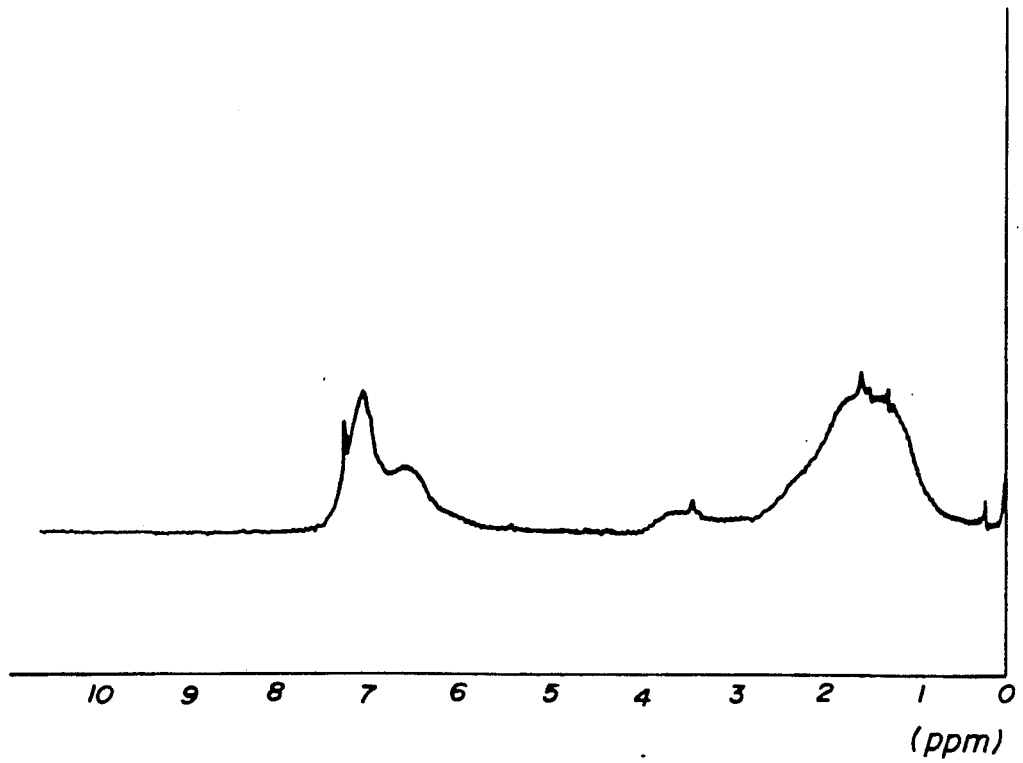
FIG. 4 is a chart showing a proton NMR spectrum of the copolymer prepared in Example 2-1.

Into a four-neck flask of 1 lit. capacity, fitted with a stirrer, a thermometer, a Dimroth condenser, a nitrogen gas inlet duct and a dropping funnel, 400 ml of a 0.2 wt. % aqueous solution of polyvinyl alcohol (saponification degree of 89%) were charged, and the temperature of the aqueous solution was raised to 50° C. Into this aqueous solution, a mixture of 38.3 g of CHMI prepared in the Reference Example 1-2, 2.1 g of BPMC prepared in the Reference Example 1-8, 60.0 g of styrene and 2.0 g of crystals of diisopropyl peroxy dicarbonate was added dropwise at 50° C. for 10 minutes under introduction of a nitrogen gas. The reaction mass was continuously stirred at 50° C. for 10 hours. The produced liquid suspension was filtered, washed with water and dried in vacuum to yield 88.6 g of a white bead-like solid substance. After a fraction of the solid product was repeatedly dissolved and precipitated in a chloroform-methanol system, various measurements shown in Table 2-1 were conducted. That is, the amount of active oxygen was found to be 0.13%, while absorption of the carbonyl groups of CHMI and BPMC residues was noticed by the IR absorption spectrum at 1690 cm$^{-1}$ and 1760 cm$^{-1}$, respectively. The amount of total nitrogen, as measured by the Kjeldahl analysis, was 3.0%. Thus, the composition of the copolymer was found to be such that the composition ratios of the maleimide compound residue, unsaturated peroxycarbonate residue and the vinyl monomer residue were 38.4 wt. %, 3.0 wt. % and 59.6 wt. %, respectively. The weight average molecular weight, measured by the gel permeation chromatography (GPC), was 120,000. The amounts of the respective components, the reaction conditions and the respective measured values are shown in Table 2-1. The IR absorption spectrum chart and the proton NMR spectrum chart of the produced copolymer are shown in FIGS. 3 and 4, respectively.

EXAMPLES 2—2 TO 2-6

Suspension copolymerization was effected in the same way as in Example 2-1 except changing the reaction conditions, the types and the amounts of the maleimide compounds, unsaturated peroxycarbonates, vinyl monomers, solvents and the radical polymerization initiators shown in Table 2-1, and analyses were conducted in the same way as in Example 2-1. The amounts of the respective components, the reaction conditions and the results of analyses are shown in Table 2-1.

EXAMPLE 2-7

Into a stainless steel autoclave of 400 ml capacity, 200 ml of a 0.15 wt. % aqueous solution of polyvinyl alcohol having a saponification degree of 89%, 40.3 g of CHMI having a purity of 99.2 wt. %, 5.3 g of BPAC having a purity of 93.6 wt. % and 0.5 g of diisobutyl peroxide having a purity of 50.0 wt. %, as a polymerization initiator, were charged, and cooled to −30° C. 55 g of a vinyl chloride monomer was then charged and the space portion of the autoclave was replaced by a nitrogen gas. After sealing tha autoclave tightly with a plug, it was placed within a constant temperature vessel maintained at 40° C. and rotated at 32 rpm. The polymerization reaction was continued in this state for 12 hours. Next, the autoclave was cooled and after the plug was removed, the unreacted vinyl monomer was removed. The produced liquid suspension was filtered, washed with water and dried under reduced pressure to give 85.5 g of white powders of the copolymer. Analyses were then conducted of the produced copolymer in the same way as in Example 2-1. The amounts of the respective components, the reaction conditions and the results of analyses are shown in Table 2-1.

TABLE 2-1

| | Examples by Suspension Polymerization | | | | | | |
|---|---|---|---|---|---|---|---|
| | Example | | | | | | |
| | 2-1 | 2-2 | 2-3 | 2-4 | 2-5 | 2-6 | 2-7 |
| Maleimide Compound | CHMI | BZMI | MMI | TBMI | ODMI | PMI | CHMI |
| Purity (wt. %) | 99.2 | 99.6 | 98.8 | 94.6 | 94.6 | 98.6 | 99.2 |
| Charged Amount (g) | 38.3 | 90.4 | 50.6 | 47.5 | 63.4 | 30.4 | 40.3 |
| Unsaturated Peroxycarbonate | BPMC | BPMC | BPAC | BPMC | BPMC | BPAL | BPAL |
| Purity (wt. %) | 96.0 | 96.0 | 94.8 | 96.0 | 96.0 | 93.6 | 93.6 |
| Charged Amount (g) | 2.1 | 5.2 | 21.1 | 0.1 | 5.2 | 2.1 | 5.3 |
| Vinyl Monomer | Styrene | Styrene | Methyl Methacrylate | Methyl Methacrylate 30 n-Butyl Acrylate 25 | Styrene 40 Methyl Methacrylate 15 | Vinyl Acetate | Vinyl Chloride |
| Charged Amount (g) | 60.0 | 5.0 | 30.0 | | | 68 | 55 |
| Solvent | — | Methyl-ethylketone | — | — | Toluene | Ethyl Acetate | — |
| Charged Amount (ml) | — | 50 | — | — | 20 | 10 | — |
| Polymerization Initiator *) | IPP | BPO | TBPV | TBPV | TBO | TBPV | DIBP |
| Addition Amount (as Pure Product wt. % to Total | 1.0 | 0.5 | 0.2 | 0.5 | 0.5 | 0.2 | 0.25 |

TABLE 2-1-continued

| | Examples by Suspension Polymerization | | | | | | |
|---|---|---|---|---|---|---|---|
| | Example | | | | | | |
| | 2-1 | 2-2 | 2-3 | 2-4 | 2-5 | 2-6 | 2-7 |
| Monomer) | | | | | | | |
| Copolymerization Temperature (°C.) | 50 | 80 | 70 | 70 | 90 | 60 | 40 |
| Copolymerization Time (hr) | 10 | 8 | 12 | 10 | 8 | 6 | 12 |
| Copolymer Yield (g) | 88.6 | 84.6 | 78.8 | 80.4 | 89.5 | 88.2 | 85.5 |
| Amount of Active Oxygen (%) | 0.13 | 0.32 | 1.30 | 0.01 | 0.31 | 0.18 | 0.4 |
| Total Nitrogen (%) | 3.0 | 6.7 | 5.1 | 3.7 | 2.3 | 2.4 | 3.1 |
| Composition (wt. %) | | | | | | | |
| Maleimide Residue | 38.4 | 89.6 | 49.7 | 40.5 | 57.4 | 30.2 | 39.6 |
| Unsaturated Peroxycarbonate Residue | 2.0 | 4.9 | 18.9 | 0.15 | 4.8 | 2.0 | 4.4 |
| Vinyl Monomer Residue | 59.6 | 5.5 | 31.4 | 59.35 | 37.8 | 67.8 | 56.0 |
| Weight Average Molecular Weight | 120,000 | 186,000 | 131,000 | 162,000 | 115,000 | 286,000 | 312,000 |

*) IPP: Diisopropyl Peroxy Dicarbonate
TBPV: t-Butyl Peroxy Pivalate
DIBP: Diisobutyl Peroxide
BPO: Dibenzoyl Peroxide
TBO: t-Butyl Peroxy Octoate

EXAMPLE 2-8

Into a four-neck flask of 500 ml capacity, fitted with a stirrer, a thermometer, a Dimroth condenser and a nitrogen gas inlet duct, 81.1 g of PMI prepared in the Reference Example 1—1, 5.3 g of BPAC prepared in the Reference Example 1-9, 15 g of styrene and 200 ml of ethyleneglycolmonobutyl ether (abbreviated hereinafter to butyl cellosolve) were charged, and the temperature of the four-neck flask was maintained at 100° C. 1.0 g of dibenzoyl peroxide was then added as a polymerization initiator and stirring was continued for 5 hours under circulation of a nitrogen gas. The reaction liquid was added dropwise to 3 lit. of cold methanol and the precipitated white powders were dried in reduced pressure. The produced white powders weighed 84.5 g.

Analyses were conducted of the produced white powders in the same way as in Example 2-1. The amounts of the respective components, the reaction conditions and the results of analyses are shown in Table 2—2.

EXAMPLES 2-9 to 2-12

Solution copolymerization was carried out in the same way as in Example 2-8, except changing the types and the amounts of the maleimide compounds, unsaturated peroxycarbonates, vinyl monomers, solvents and the radical polymerization initiators, and the reaction conditions, shown in Table 2—2, and analyses were conducted in the same way as in Example 2-1. The amounts of the respective components, the reaction conditions and the results of analyses are shown in Table 2—2.

TABLE 2-2

| | Examples by Solution Polymerization | | | | |
|---|---|---|---|---|---|
| | Example | | | | |
| | 2-8 | 2-9 | 2-10 | 2-11 | 2-12 |
| Maleimide Compound | PMI | PMMI | BZMI | TBMI | PMMI |
| Purity (wt. %) | 98.6 | 92.8 | 99.6 | 94.6 | 92.8 |
| Charged Amount (g) | 81.1 | 43.1 | 20.1 | 62.4 | 30.2 |
| Unsaturated Peroxycarbonate | BPAC | BPMC | BPAC | BPMC | BPAL |
| Purity (wt. %) | 94.8 | 96.0 | 94.8 | 96.0 | 93.6 |
| Charged Amount (g) | 5.3 | 5.2 | 1.1 | 1.0 | 2.1 |
| Vinyl Monomer | Styrene | Styrene 45 Acrylonitrile 10 | Methyl Methacrylate 79 | Methyl Methacrylate 40 | Vinyl Acetate 70 |
| Charged Amount (g) | 15.0 | | | | |
| Solvent | Butyl Cellusolve | Toluene | Toluene 200 Dioxane 100 | Toluene | Ethanol |
| Charged Amount (ml) | 200 | 200 | | 100 | 300 |
| Polymerization Initiator *) | BPO | BPO | TBPV | AIBN | AIBN |
| Addition Amount (as Pure Product wt. % to Total Monomer) | 1.0 | 0.5 | 3.0 | 0.2 | 0.1 |
| Copolymerization Temperature (°C.) | 100 | 80 | 80 | 60 | 60 |
| Copolymerization Time (hr) | 5 | 8 | 7 | 8 | 7 |
| Copolymer Yield (g) | 84.5 | 78.6 | 82.4 | 86.8 | 89.6 |
| Amount of Active Oxygen (%) | 0.34 | 0.30 | 0.08 | 0.06 | 0.81 |
| Total Nitrogen (%) | 6.2 | 2.9 | 1.4 | 5.0 | 2.1 |
| Composition (wt. %) | | | | | |
| Maleimide Residue | 76.6 | 38.8 | 20.7 | 54.7 | 28.1 |
| Unsaturated Peroxycarbonate Residue | 4.9 | 4.6 | 1.2 | 0.9 | 2.0 |
| Vinyl Monomer Residue | 18.5 | 56.6 | 79.0 | 44.4 | 69.9 |
| Weight Average Molecular | 7,800 | 24,000 | 2,200 | 28,000 | 126,000 |

TABLE 2-2-continued

| | Examples by Solution Polymerization | | | | |
|---|---|---|---|---|---|
| | | | Example | | |
| | 2-8 | 2-9 | 2-10 | 2-11 | 2-12 |
| Weight | | | | | |

*) BPO: Dibenzoyl Peroxide
AIBN: Azobis Isobutyronitrile
TBPV: t-Butyl Peroxy Pivalate

EXAMPLE 2-13

Into a four-neck flask of 500 ml capacity, fitted with a thermometer, a stirrer, a dropping funnel and a nitrogen inlet duct, was charged 200 ml of an aqueous solution in which 1.0 g sodium dodecyl sulfate was dissolved, after which 30 g of a solution mixture obtained upon mixing 60.9 g of PMI prepared by Reference Example 1—1, 37 g of BPAC prepared by Reference Example 1-9 and 50 g of methylethylketone was added to the aqueous solution. After the temperature within the flask was raised to 50° C., 15 ml of an aqueous solution in which 0.6 g of potassium persulfate was dissolved and an aqueous solution in which 0.6 g of sodium hydrogen sulfite was dissolved were prepared, each of 1.5 ml of these solutions was added to the flask five times in the same manner every half hour. Then, after stirring for one hour, the reaction system was cooled to yield a liquid emulsion. The produced liquid emulsion was introduced into 1 lit. of a 0.5 mole/lit. aqueous solution of sodium sulfate. After salting out and washing twice with 1 lit. of water, the resulting product was dried to obtain 74.5 g of white powders. These white powders were then analyzed in the same way as in Example 2-1. The amounts of the respective components, the reaction conditions and the results of analyses are shown in Table 2-3.

EXAMPLES 2-14 and 2-15

Emulsion copolymerization was conducted in the same way as in Example 2-13, except changing the types and the amounts of the maleimide compounds, unsaturated peroxycarbonates, vinyl monomers, solvents and the radical polymerization initiators, and the reaction conditions, as shown in Table 2-3, and analyses were conducted in the same way as in Example 2-1. The amounts of the respective components, the reaction conditions and the results of analyses are shown in Table 2-3.

TABLE 2-3

| | Examples by Suspension Polymerization | | |
|---|---|---|---|
| | | Example | |
| | 2-13 | 2-14 | 2-15 |
| Maleimide Compound | PMI | CHMI | BZMI |
| Purity (wt. %) | 98.6 | 99.2 | 99.6 |
| Charged Amount (g) | 60.9 | 35.3 | 85.3 |
| Unsaturated Peroxycarbonate | BPAC | BPMC | BPAC |
| Purity (wt. %) | 93.6 | 96.0 | 94.8 |
| Charged Amount (g) | 3.2 | 10.4 | 0.21 |
| Vinyl Monomer | Styrene | Methyl Methacrylate | Ethyl Acrylate |
| Charged Amount (g) | 37 | 55 | 14.8 |
| Solvent | Methylethylketone | — | Methylethylketone |
| Charged Amount (ml) | 50 | — | 100 |
| Used Amount of Polymerization Initiator | 15 ml of 4 wt. % Aqueous Solution of Potassium Persulfate and 15 ml of 4 wt. % Aqueous | | |

TABLE 2-3-continued

| | Examples by Suspension Polymerization | | |
|---|---|---|---|
| | | Example | |
| | 2-13 | 2-14 | 2-15 |
| | | Solution of Sodium Hydrogensulfite | |
| Copolymerization Temperature (°C.) | 50 | 50 | 50 |
| Copolymerization Time (hr) | 3.5 | 3.5 | 3.5 |
| Copolymer Yield (g) | 74.5 | 72.6 | 81.4 |
| Amount of Active Oxygen (%) | 0.27 | 0.62 | 0.01 |
| Total Nitrogen (%) | 4.8 | 2.7 | 6.3 |
| Composition (wt. %) | | | |
| Maleimide Residue | 59.3 | 34.5 | 84.2 |
| Unsaturated Peroxycarbonate Residue | 3.0 | 9.5 | 0.15 |
| Vinyl Monomer Residue | 37.7 | 56 | 15.7 |
| Weight Average Molecular Weight | 220,000 | 374,000 | 138,000 |

REFERENCE EXAMPLE 3-1 SYNTHESIS OF MALEIMIDE COMPOUND

N-phenyl maleimide, referred to hereinafter as PMI, was synthesized in accordance with the method described in Organic Synthesis, Vol. 41, page 93. That is, 196 g (2 mole) of maleic anhydride and 2.5 lit. of benzene were charged into a three-neck flask of 5 lit. capacity and dissolved. 186 g of aniline (2 mole) dissolved in 200 ml of benzene were then added dropwise at room temperature for one hour to the reaction mass. After the resulting product was cooled to 15° C., precipitated crystals were filtered off and dried in vacuum. The produced crystals weighed 370 g and had a melting point of 201° C.

Then, into a three-neck flask of 2 lit. capacity fitted with a stirrer and a reflux cooler, 316 g of the crystals produced by the above reaction, 65 g of an anhydride of sodium acetate and 670 ml of acetic anhydride were charged, and the resulting mixture was gradually raised in temperature and heated for 30 minutes over a steam bath. After stirring for one hour, the resulting product was poured into 1.3 lit. of ice water to precipitate crystals. The crystals were then filtered, washed with 500 ml of cold water and petroleum ether and dried to give 220 g of yellow crystals having a melting point of 88° C. The produced crystals were further recrystallized twice in cyclohexane. The melting point of the crystals was 89.5° C. The molecular weight, the nitrogen content, the purity and the IR absorption spectrum were then measured. The results are shown in Table 3-1.

REFERENCE EXAMPLES 3-2 to 3-6

Similarly to the Reference Example 3-1, in accordance with the method described in Organic Synthesis, Vol. 41, page 93, N-cyclohexyl maleimide, referred to hereinafter as CHMI, N-methyl maleimide, referred to hereinafter as MMI, N-octadecyl maleimide, referred to hereinafter as ODMI, N-benzyl maleimide, referred to hereinafter as BZMI and N-phenyl-α-methyl maleimide, referred to hereinafter as PMMI, were prepared, and the molecular weight, the nitrogen content, the purity and the IR absorption spectrum thereof were measured. The results are shown in Table 3-1.

TABLE 3-1

| Ref. Ex. | Maleimide Compound | Molecular Weight | Nitrogen Content (Theoretical Value, %) | Purity (wt. %) | IR Absorption Spectrum ($\nu c = 0$, $cm^{-1}$) |
|---|---|---|---|---|---|
| 3-1 | PMI | 173.2 | 8.09 | 98.6 | 1700 |
| 3-2 | CHMI | 179.2 | 7.82 | 99.2 | 1710 |
| 3-3 | MMI | 111.1 | 10.26 | 98.8 | 1712 |
| 3-4 | ODMI | 349.6 | 4.01 | 94.6 | 1710 |
| 3-5 | BZMI | 187.2 | 7.48 | 99.6 | 1712 |
| 3-6 | PMMI | 187.2 | 7.48 | 92.8 | 1700 | identified as t-butyl peroxy isopropyl fumarate, referred to hereinafter as TBIPF. The purity was 95 wt. % and the yield was 80 mole %. The result of each measurement is shown in Table 3-2.

REFERENCE EXAMPLES 3-8 to 3-10

Similarly to the Reference Example 3-7, t-amyl peroxy methyl fumarate, referred to hereinafter as TAMF, t-butyl peroxy methacrylate, referred to hereinafter as TBMA and cumyl peroxy methacrylate, referred to hereinafter as CMA, were prepared, and the molecular weight, the purity, the IR absorption spectrum and the theoretical active oxygen content were measured. The results are shown in Table 3-2.

TABLE 3-2

| Ref. Ex. | Unsaturated Peroxyester | Structural Formula | Molecular Weight | Purity (wt. %) | IR Absorption Spectrum ($\nu c = 0$, $cm^{-1}$) | Theoretical Amount of Active Oxygen (%) |
|---|---|---|---|---|---|---|
| 3-7 | TBIPF | (CH₃)₂CH—O—C(=O)—C(H)=C(H)—C(=O)—OO—C(CH₃)₃ | 230.3 | 95 | 1760, 1720 | 6.95 |
| 3-8 | TAMF | H₃COC(=O)—C(H)=C(H)—C(=O)—OO—C(CH₃)(CH₂CH₃)CH₃ | 216.2 | 92 | 1760, 1720 | 7.40 |
| 3-9 | TBMA | CH₂=C(CH₃)—C(=O)—OO—C(CH₃)₃ | 158.2 | 82 | 1760 | 10.11 |
| 3-10 | CMA | CH₂=C(CH₃)—C(=O)—OO—C(CH₃)₂—C₆H₅ | 220.3 | 80 | 1765 | 7.26 |

REFERENCE EXAMPLE 3-7 SYNTHESIS OF UNSATURATED PEROXYESTERS

Into a four-neck flask, 440 parts of a 10 wt. % aqueous solution of caustic soda and 90 parts of t-butylhydroperoxide were charged to prepare an aqueous solution of a sodium salt of t-butylhydroperoxide. Into this aqueous solution, 177 parts of i-propylfumaric acid chloride were charged dropwise for 30 minutes under vigorous agitation at 20° C. After continued ageing for 90 minutes, an organic phase was washed with a 5 wt. % aqueous solution of sodium carbonate and then washed twice with water. An organic phase was dehydrated over magnesium sulfate to yield 180 parts of a colorless liquid.

The active oxygen content in the produced liquid was 6.60. As a result of the measurement of the IR absorption spectrum, the absorption proper to the carbon-carbon double bond was noticed at 2990 $cm^{-1}$, whereas the absorption proper to the carbonyl group of the peroxyester and the absorption proper to the carbonyl group of the ester were noticed at 1760 $cm^{-1}$ and 1720 $cm^{-1}$, respectively. Thus, the produced liquid was

EXAMPLE 3-1

Into a four-neck flask, fitted with a stirrer, a thermometer, a Dimroth condenser, a nitrogen gas inlet pipe and a dropping funnel, 400 parts of a 0.2 wt. % aqueous solution of polyvinyl alcohol were charged. A liquid mixture containing 99.4 parts of PMI prepared in Reference Example 3-1, 2.1 parts of TBIPF prepared in Reference Example 3-7 and 60 parts of methylethylketone was added to the solution, and the temperature of the reaction liquid was raised to 50° C. The polymerization reaction was then initiated by adding 2.0 parts of a 50 wt. % toluene solution of diisopropyl peroxy dicarbonate as the radical polymerization initiator. After the reaction was continued at 50° C. for 10 hours, a pale yellowish solid was filtered off from the liquid suspension. The produced solid was washed twice with water and, after that, dried in vacuum at room temperature. The yield after drying was 78.6 parts.

A part of the produced solid was purified by repeated dissolution and precipitation in the chloroform/methanol system, and subjected to each analysis. That is, it was found that the active oxygen amount by iodometry method was 0.16%, while as for the IR absorption spectrum, the absorption proper to the carbonyl group of polymers as shown in Table 3—3. The results and the reaction conditions are shown in Table 3—3.

TABLE 3-3

| Example | 3-1 | 3-2 | 3-3 | 3-4 |
|---|---|---|---|---|
| Maleimide Compound | PMI | CHMI | MMI | ODMI |
| Purity (%) | 98.6 | 99.2 | 98.8 | 94.6 |
| Charged Amount (Parts) | 99.4 | 95.8 | 100.0 | 95.1 |
| Unsaturated Peroxyester | TBIPF | TBIPF | TAMF | TAMF |
| Purity (%) | 95 | 95 | 92 | 92 |
| Charged Amount (Parts) | 2.1 | 5.3 | 5.4 | 10.9 |
| Type of Polymer System* | 0.2% Polyvinyl Alcohol; Water, 400 Parts; MEK, 60 Parts | IPA, 200 Parts; MEK, 100 Parts | IPA, 150 Parts; Ethanol, 150 Parts | 0.2% Polyvinyl Alcohol; Water, 400 Parts; MEK, 60 Parts |
| Polymerization Initiator** | IPP | IPP | ND | ND |
| Addition Amount (as Pure Product, in Parts) | 1.0 | 2.0 | 1.0 | 0.2 |
| Polymerization Temperature (°C.) | 50 | 60 | 45 | 40 |
| Polymerization Time (hr) | 10 | 10 | 12 | 10 |
| Yield of Copolymer (Parts) | 78.6 | 74.6 | 80.1 | 71.4 |
| Amount of Active Oxygen (%) | 0.16 | 0.40 | 0.38 | 0.84 |
| Ratio of Unsaturated Peroxyester Residues in Copolymer (wt. %) | 2.3 | 5.8 | 5.1 | 11.4 |
| Weight Average Molecular Weight | 126,000 | 3,200 | 12,000 | 385,000 |

| Example | 3-5 | 3-6 | 3-7 |
|---|---|---|---|
| Maleimide Compound | BZMI | PMMI | CHMI |
| Purity (%) | 99.6 | 92.8 | 99.2 |
| Charged Amount (Parts) | 80.3 | 107.7 | 99.8 |
| Unsaturated Peroxyester | TBMA | TBIPF | CMA |
| Purity (%) | 82 | 95 | 80 |
| Charged Amount (Parts) | 24.4 | 0.11 | 1.25 |
| Type of Polymer System* | IPA, 150 Parts; Ethanol, 150 Parts | 0.2% Aqueous Solution of Polyvinyl Alcohol; Water, 400 Parts; MEK, 50 Parts | 0.2% Aqueous Solution of Polyvinyl Alcohol; Water, 400 Parts; MEK, 60 Parts |
| Polymerization Initiator** | IPP | IPP | AIBN |
| Addition Amount (as Pure Product, in Parts) | 0.5 | 0.2 | 0.5 |
| Polymerization Temperature (°C.) | 50 | 40 | 65 |
| Polymerization Time (hr) | 12 | 12 | 8 |
| Yield of Copolymer (Parts) | 71.2 | 64.0 | 78.8 |
| Amount of Active Oxygen (%) | 1.89 | 0.01 | 0.08 |
| Ratio of Unsaturated Peroxyester Residues in Copolymer (wt. %) | 18.6 | 0.1 | 1.1 |
| Weight Average Molecular Weight | 8,200 | 588,000 | 168,000 |

Figure 5:
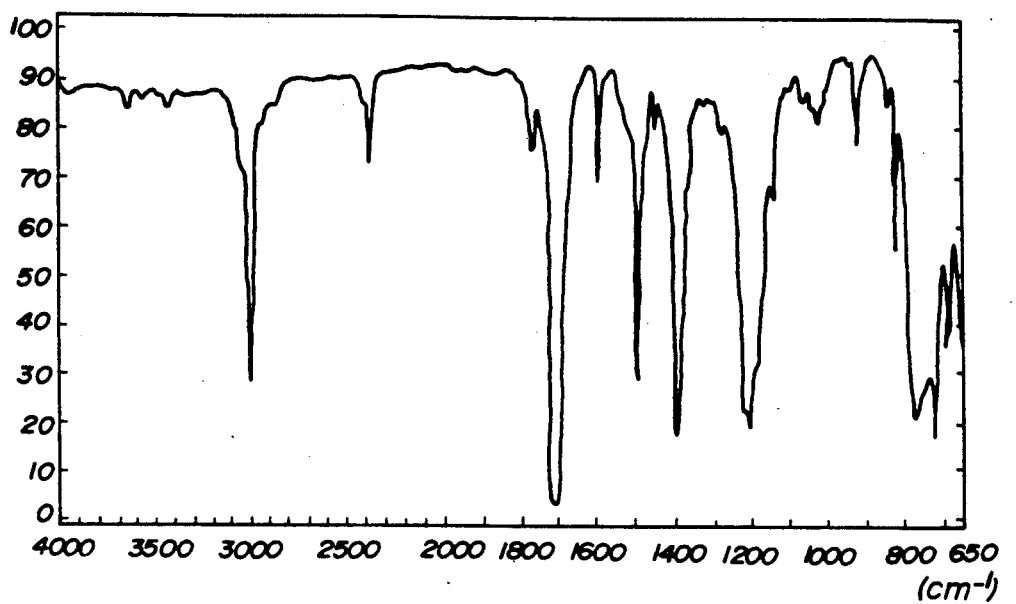
FIG. 5 is a chart showing an infrared absorption spectrum of a maleimide random copolymer prepared in Example 3-1.
Figure 6:
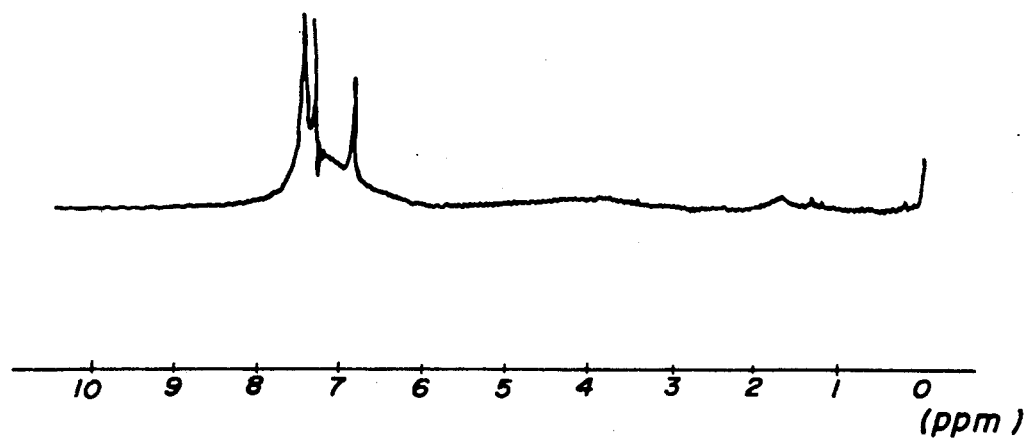
FIG. 6 is a chart showing proton NMR of the copolymer of Example 3-1.

*IPA: i-Propyl Alcohol
MEK: Methylethylketone
**IPP: Diisopropyl Peroxy Dicarbonate
ND: t-Butyl Peroxy Neodecanoate the PMI residue, the absorption proper to the carbonyl group of the ester of the TBIPF residue and the absorption proper to the carbonyl group of the peroxyester of the TBIPF residue were noticed at 1700 cm$^{-1}$, 1720 cm$^{-1}$ and 1760 cm$^{-1}$. respectively. The total nitrogen content by the Kjeldahl analysis was 7.9%. The weight average molecular weight by the gel permeation chromatography method, calculated as polystyrene, was 126,000. From the above results, the produced pale yellow solid could be identified as a copolymer containing 97.7% of PMI residues and 2.3% of TBIPF residues. The results of analyses and the reaction conditions are shown in Table 3—3. The IR absorption spectrum and the proton NMR of the produced copolymer are shown in FIGS. 5 and 6, respectively.

EXAMPLES 3-2 to 3-7

The copolymerization reaction was carried out in the same way as in Example 3-1, except changing the types and the amounts of the maleimide compounds and the unsaturated peroxyesters and the polymerization conditions, and the analyses were made of the produced copolymers as shown in Table 3—3. The results and the reaction conditions are shown in Table 3—3.

REFERENCE EXAMPLE 4-1 SYNTHESIS OF UNSATURATED PEROXYESTER

Into a four-neck flask, 440 parts of a 10 wt. % aqueous solution of caustic soda and 90 parts of t-butylhydroperoxide were charged to prepare an aqueous solution of a sodium salt of t-butylhydroperoxide. Into this aqueous solution, 177 parts of i-propylfumaric acid chloride were charged for 30 minutes dropwise under vigorous agitation at 20° C. After continued agitation for 90 minutes, an organic phase was washed with a 5 wt. % aqueous solution of sodium carbonate and washed twice with water. An organic phase was then dehydrated over magnesium sulfate to yield 180 parts of colorless liquid.

The active oxygen content in the produced liquid was 6.60. As a result of the measurement of the IR absorption spectrum, the absorption proper to the carbon-carbon double bond was noticed at 2990 cm$^{-1}$, whereas the absorption proper to the carbonyl group of the peroxyester and the absorption proper to the carbonyl group of the ester were noticed at 1760 cm$^{-1}$ and 1720

$cm^{-1}$, respectively. Thus, the produced liquid was identified as t-butyl peroxy isopropyl fumarate, referred to hereinafter as TBIPF, the purity was 95 wt. % and the yield was 80 mole %. The result of each measurement is shown in Table 4-1.

REFERENCE EXAMPLES 4-2 to 4—4

Similarly to the Reference Example 4-1, t-amyl peroxy methyl fumarate, referred to hereinafter as TAMF, t-hexyl peroxy methacrylate, referred to hereinafter as THMA and cumyl peroxy methacrylate, referred to hereinafter as CMA, were prepared, and the molecular weight, the purity, the IR absorption spectrum and the theoretical active oxygen content were measured. The results are shown in Table 4-1.

dried in vacuum. The produced solid weighed 84.2 parts.

A part of the produced solid was then purified by dissolution and precipitation in the chloroform/methanol system and put to the following analyses. The active oxygen amount, as measured by the iodometric method, was 0.13%, while the total nitrogen content, as measured by the Kjeldahl method, was 2.91%. The weight average molecular weight by the GPC method, calculated as polystyrene, was 134,000. As a result of the IR absorption spectrum, the absorption proper to the CHMI residue and the absorption proper to the TBIPF residue were noticed at 1700 $cm^{-1}$ and 1760 $cm^{-1}$, respectively. From the above results, the produced copolymer was identified as a random copolymer

TABLE 4-1

| Ref. Ex. | Unsaturated Peroxyester | Structural Formula | Molecular Weight | Purity (wt. %) | IR Absorption Spectrum ($vc = 0$, $cm^{-1}$) | Theoretical Amount of Active Oxygen (%) |
|---|---|---|---|---|---|---|
| 4-1 | TBIPF | $(CH_3)_2CH-O-C(=O)-CH=CH-C(=O)-OO-C(CH_3)_3$ | 230.3 | 95 | 1760, 1720 | 6.95 |
| 4-2 | TAMF | $H_3COC(=O)-CH=CH-C(=O)-OO-C(CH_3)_2-CH_2CH_3$ | 216.2 | 92 | 1760, 1720 | 7.40 |
| 4-3 | THMA | $CH_2=C(CH_3)-C(=O)-OO-C(CH_3)(CH_2CH_2CH_3)$ | 186.2 | 83 | 1760 | 9.67 |
| 4-4 | CMA | $CH_2=C(CH_3)-C(=O)-OO-C(CH_3)_2-C_6H_5$ | 220.3 | 80 | 1765 | 7.26 |

EXAMPLE 4-1

Figure 7:
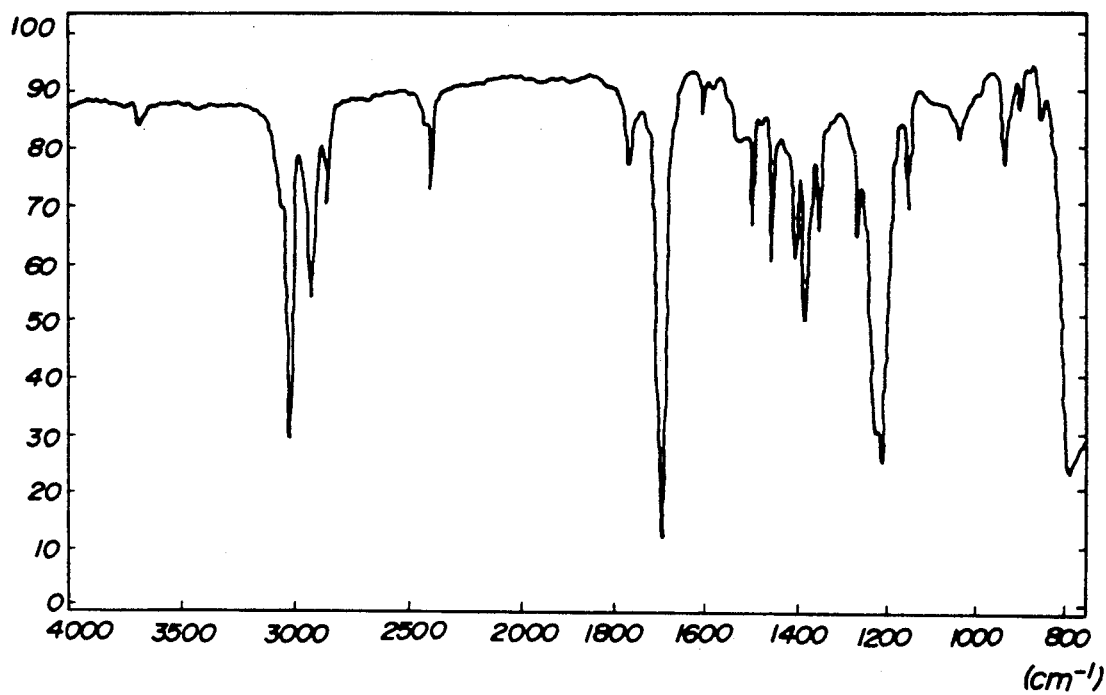
FIG. 7 is a chart showing an infrared absorption spectrum of a maleimide random copolymer prepared in Example 4-1.
Figure 8:
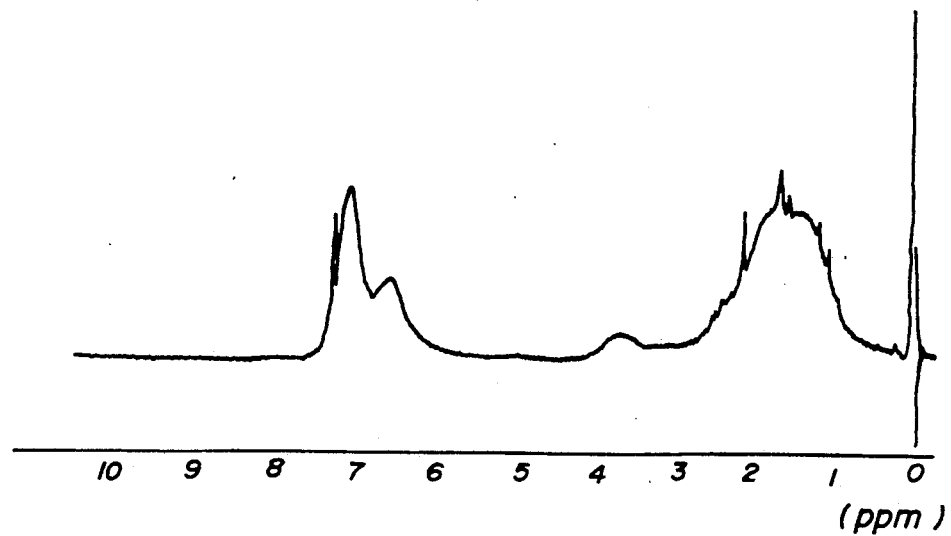
FIG. 8 is a chart showing proton NMR of the copolymer of Example 4-1.

Into a four-neck flask, fitted with a stirrer, a thermometer, a Dimroth condenser and a nitrogen gas inlet duct, 400 parts of a 0.2 wt. % aqueous solution of polyvinyl alcohol were charged. Into this solution was added a solution mixture containing 38.3 parts of CHMI prepared in the Reference Example 1-2, 2.1 parts of TBIPF prepared in the Reference Example 4-1, 60 parts of styrene and 2 parts of diisopropyl peroxy dicarbonate, as a polymerization initiator, under a nitrogen gas stream. The temperature of the reaction liquid was raised to 50° C. and the reaction was continued for 10 hours. A white bead-like solid was filtered off from the produced liquid suspension, washed with water and containing 37.2 wt. % of the CHMI residues, 1.8 wt. % of the TBIPF residues and 61.0 wt. % of the styrene residues. The results of the analyses and the reaction conditions are shown in Table 4-2. The IR absorption spectrum and the proton NMR spectrum of the produced copolymer are shown in FIGS. 7 and 8, respectively.

EXAMPLES 4-2 to 4-6

The copolymerization reaction was conducted in the same way as in Example 4-1, except changing the types and the amounts of the maleimide compounds, unsaturated peroxyesters and vinyl monomers, and the reaction conditions, as shown in Table 4-2, and the produced copolymers were put to the analyses shown in Table 4-2. The results and the reaction conditions are shown in Table 4-2.

TABLE 4-2

| Example | 4-1 | 4-2 | 4-3 | 4-4 | 4-5 | 4-6 |
|---|---|---|---|---|---|---|
| Maleimide Compound | CHMI | PMI | ODMI | MMI | BZMI | TBMI |
| Purity (wt. %) | 99.2 | 98.6 | 94.6 | 98.8 | 99.6 | 94.6 |
| Charged Amount (Parts) | 38.3 | 40.6 | 71.9 | 40.5 | 90.4 | 31.7 |
| Unsaturated Peroxyester | TBIPF | TBIPF | TBIPF | TAMF | THMA | CMA |

TABLE 4-2-continued

| Example | 4-1 | 4-2 | 4-3 | 4-4 | 4-5 | 4-6 |
|---|---|---|---|---|---|---|
| Purity (%) | 95 | 95 | 95 | 92 | 83 | 80 |
| Charged Amount (Parts) | 2.1 | 21 | 2.1 | 2.2 | 6 | 6.3 |
| Vinyl Monomer | Styrene | Methyl Methacrylate | Vinyl Acetate | Styrene 50 | Styrene | Methyl Methacrylate |
| Charged Amount (Parts) | 60 | 40 | 30 | Acrylonitrile 8 | 5 | 65 |
| Solvent | — | — | Methylethylketone | — | Methylethylketone | — |
| Charged Amount (Parts) | — | — | 30 | — | 60 | — |
| Polymerization Initiator* | IPP | IPP | IB | IPP | IB | IB |
| Charged Amount (as Pure Product, Parts) | 2 | 1 | 0.2 | 0.1 | 4 | 0.2 |
| Copolymerization Temperature (°C.) | 50 | 60 | 40 | 45 | 50 | 35 |
| Copolymerization Time (hr) | 10 | 3 | 8 | 6 | 10 | 10 |
| Copolymer Yield (Parts) | 84.2 | 77.8 | 82.4 | 81.2 | 86.2 | 85.6 |
| Amount of Active Oxygen (%) | 0.13 | 1.37 | 0.15 | 0.16 | 0.38 | 0.38 |
| Total Nitrogen (%) | 2.91 | 3.33 | 2.76 | 1.65 | 6.69 | 2.76 |
| Composition in Copolymer | | | | | | |
| Maleimide Residue (wt. %) | 37.2 | 41.2 | 68.8 | 41.2 | 89.4 | 30.2 |
| Vinyl Monomer Residue (wt. %) | 61.0 | 39.1 | 29.1 | 56.6 | 5.1 | 64.6 |
| Unsaturated Peroxyester Residue (wt. %) | 1.8 | 19.7 | 2.1 | 2.2 | 5.5 | 5.2 |
| Weight Average Molecular Weight (GPC, as Polystyrene) | 48,000 | 6,000 | 412,000 | 182,000 | 2,400 | 526,000 |

*IPP: Diisopropyl Peroxy Dicarbonate
IB: Diisobutyl Peroxide

EXAMPLE 4-7

Into a four-neck flask, fitted with a stirrer, a thermometer, a Dimroth condenser and a nitrogen gas inlet pipe, 81.1 parts of PMI prepared in the Reference Example 1—1, 18 parts of styrene, 2.1 parts of TBIPF prepared in the Reference Example 4-1 and 200 parts of toluene were charged. After the temperature of the reaction mass was raised to 65° C., under circulation of a nitrogen gas, 1 part of t-butyl peroxy pivalate was added to the reaction mass, and stirring was continued for 7 hours. After cooling, the reaction liquid was added dropwise into a large quantity of cold methanol and precipitated yellow powders were dried under reduced pressure. The produced powders weighed 87.6 parts. The produced powders were put to the analyses similar to those of the Example 4-1. The results and the reaction conditions are shown in Table 4-3.

EXAMPLES 4-8 and 4-9

Copolymerization reaction was carried out in the same way as in Example 4-7 except changing the types and the amounts of the maleimide compounds, unsaturated peroxyesters and vinyl monomers and the polymerization conditions as shown in Table 4-3, and the produced copolymers were put to the analyses shown in Table 4-3. The results and the reaction conditions are shown in Table 4-3.

TABLE 4-3

| Example | 4-7 | 4-8 | 4-9 |
|---|---|---|---|
| Maleimide Compound | PMI | BZMI | PMMI |
| Purity (wt. %) | 98.6 | 99.6 | 92.8 |
| Charged Amount (Parts) | 81.1 | 40.2 | 32.3 |
| Unsaturated Peroxyester | TBIPF | TBIPF | TAMF |
| Purity (%) | 95 | 95 | 92 |
| Charged Amount (Parts) | 2.1 | 5.3 | 10.9 |
| Vinyl Monomer | Styrene | Methyl Methacrylate | n-Butyl Acrylate 20 Methyl Methacrylate 40 |
| Charged Amount (Parts) | 18 | 55 | |
| Solvent | Toluene | Methylethylketone 100 Isopropyl Alcohol 100 | Cyclohexanone |
| Charged Amount (Parts) | 200 | | 200 |
| Polymerization Initiator* | PV | IPP | IPP |
| Charged Amount (as Pure Product, Parts) | 1 | 1 | 2 |
| Copolymerization Temperature (°C.) | 65 | 60 | 50 |
| Copolymerization Time (hr) | 7 | 5 | 8 |
| Copolymer Yield (Parts) | 87.6 | 84.6 | 76.2 |
| Amount of Active Oxygen (%) | 0.24 | 0.47 | 0.84 |
| Total Nitrogen (%) | 6.34 | 2.90 | 2.11 |
| Composition in Copolymer | | | |
| Maleimide Residue (wt. %) | 78.4 | 38.3 | 28.2 |
| Vinyl Monomer Residue (wt. %) | 18.2 | 54.4 | 60.4 |
| Unsaturated Peroxyester Residue (wt. %) | 3.4 | 6.8 | 11.4 |
| Weight Average Molecular Weight (GPC, as Polystyrene) | 128,000 | 8,200 | 48,000 |

*PV: t-Butyl Peroxy Pivalate
IPP: Diisopropyl Peroxycarbonate

REFERENCE EXAMPLE 5-1 PREPARATION OF RANDOM COPOLYMER

Into a four-neck flask, fitted with a stirrer, a thermometer, a Dimroth condenser, a nitrogen gas inlet pipe and a dropping funnel, 300 parts of a 0.2 wt. % aqueous solution of polyvinyl alcohol were charged, and the temperature of the solution was raised to 50° C. A liquid mixture of 95 parts of styrene, 5 parts of t-butyl peroxyallyl carbonate and 2 parts of isopropyl peroxy dicarbonate as a polymerization initiator was prepared, and added dropwise to the solution for 10 minutes under stirring and introduction of a nitrogen gas. Stirring was continued at 50° C. for 10 minutes to produce a white bead-like solid. The produced bead-like solid was filtered, washed with water and dried in vacuum. The solid substance weighed 91 parts. The active oxygen content of the polymer was 0.41%. As a result of the measurement of the IR absorption spectrum, the absorption proper to the carbonyl group of the peroxy carbonate group was noticed at 1780 cm$^{-1}$. The weight average molecular weight, as found by the GPC method, was 110,000. From the above results, the produced polymer could be identified as a styrene polymer containing peroxy groups with 0.41% of the active oxygen content.

REFERENCE EXAMPLES 5-2 to 5-4

Vinyl random copolymers containing the peroxy groups were prepared substantially in the same way as in Reference Example 5-1, except changing the types and the charged amounts of the vinyl monomers and copolymerizable peroxides, the types and the charged amounts of the polymerization initiators, the polymerization temperature and the polymerization time, and put to each measurement. The results are shown in Table 5-1.

REFERENCE EXAMPLE 5—5

Into a stainless steel autoclave were charged an aqueous solution of polyvinyl alcohol, t-butyl peroxyallyl carbonate and t-butyl peroxy neodecanoate, as a polymerization initiator, in charged amounts shown in Table 5-1. After the atmosphere was replaced by a nitrogen gas, 98 parts of a vinyl chloride monomer were charged, and the polymerization was carried out under raising the temperature to 58° C. Each measurement was then conducted in the same way as in Reference Example 5-1. The results are shown in Table 5-1.

Table 5-1

|  | Ref. Ex. 5-1 | Ref. Ex. 5-2 | Ref. Ex. 5-3 | Ref. Ex. 5-4 | Ref. Ex. 5-5 |
| --- | --- | --- | --- | --- | --- |
| Type of Vinyl Monomer | Styrene | Methyl Methacrylate | Vinyl Acetate | Styrene 60 Methyl Methacrylate 40 | Vinyl Chloride |
| Charged Amount (Parts) | 95 | 80 | 98 |  | 98 |
| Copolymerizable Peroxide* | TBAC | MEC | TBIPF | TAPM | TBAC |
| Charged Amount (Parts) | 5 | 20 | 2 | 0.2 | 2 |
| Polymerization Initiator** | IPP | IPP | IPP | ND | ND |
| Charged Amount (Parts) | 2 | 1 | 0.2 | 1 | 0.1 |
| Polymerization Temperature (°C.) | 50 | 45 | 55 | 60 | 58 |
| Polymerization Time (hr) | 10 | 12 | 6 | 10 | 10 |
| Copolymer Yield (Parts) | 91 | 87 | 89 | 86 | 88 |
| Amount of Active Oxygen (%) | 0.41 | 1.32 | 0.13 | 0.013 | 0.14 |
| Weight Average Molecular Weight of Copolymer (GPC) | 110,000 | 220,000 | 180,000 | 65,000 | 81,000 |

*TBAC: t-Butyl Peroxyallyl Carbonate
NEC: t-Butyl Peroxymethacryloyloxyethyl Carbonate
TBIPF: t-Butyl Peroxy Isopropyl Fumarate
TAPM: t-Amyl Peroxy Methacrylate
**IPP: Diisopropyl Peroxy Dicarbonate
ND: t-Butyl Peroxy Neodecanoate

EXAMPLE 5-1

Into a four-neck flask, fitted with a stirrer, a thermometer, a Dimroth condenser and a nitrogen gas inlet pipe, a 0.2 wt. % aqueous solution of polyvinyl alcohol (saponification degree of 89%) was charged. Into this aqueous solution were charged 100 parts of a styrene copolymer prepared in the Reference Example 5-1, 50 parts of cyclohexyl maleimide and 50 parts of methyl methacrylate, and the resulting mass was stirred vigorously at 25° C. for one hour to prepare a liquid suspension. The reaction temperature was then raised to 90° C. to initiate the polymerization. After stirring for 16 hours, a bead-like solid was produced. The produced solid was filtered off, washed with water and dried under reduced pressure. The produced solid weighed 178 parts.

The weight average molecular weight of the polymer was measured by the gel permeation chromatography (GPC) and found to be 276,000. As a result of the measurement of the IR absorption spectrum, the absorption proper to the carbonyl group of the maleimide group and the absorption proper to the carbonyl group of the methyl methacrylate residue were noticed at 1700 cm$^{-1}$ and at 1725 cm$^{-1}$, respectively. It was found by elementary analyses that the total nitrogen was 1.91% and the ratio of the maleimide residues in the polymer was 24.4%. From the above results, the produced polymer was identified as a maleimide graft copolymer having the polystyrene chain as main chains and the copolymer chain of the cyclohexyl maleimide and methyl methacrylate as side chains. The reaction conditions and the yield, the weight average molecular weight and the total nitrogen content of the graft copolymer are shown in Table 5-2.

EXAMPLES 5-2 to 5-7

Graft copolymers were prepared in substantially the same way as in Example 5-1, except changing the types of the copolymers used, the types and the charged amounts of the maleimide compounds and the vinyl monomers, the polymerization temperature and the polymerization time, and put to each measurement. The conditions and the results are shown in Table 5-2.

TABLE 5-2

|  | Ex. 5-1 | Ex. 5-2 | Ex. 5-3 | Ex. 5-4 |
| --- | --- | --- | --- | --- |

TABLE 5-2-continued

| Copolymer in Ref. Ex. | Ref. Ex. 5-1 | Ref. Ex. 5-3 | Ref. Ex. 5-2 | Ref. Ex. 5-3 |
| --- | --- | --- | --- | --- |
| Charged Amount (Parts) | 100 | 100 | 100 | 100 |
| Type of Maleimide Compound | Cyclohexyl Maleimide | Phenyl Maleimide | Benzyl Maleimide | Isopropyl Maleimide |
| Charged Amount (Parts) | 50 | 50 | 200 | 20 |
| Type of Vinyl Monomer | Methyl Methacrylate | Vinyl Acetate | Styrene | Styrene |
| Charged Amount (Parts) | 50 | 100 | 200 | 80 |
| Polymerization Temperature (°C.) | 90 | 70 | 90 | 90 |
| Polymerization Time (hr) | 16 | 10 | 18 | 10 |
| Yield of Graft Copolymer (Parts) | 178 | 221 | 476 | 181 |
| Weight Average Molecular Weight of Graft Copolymer (GPC) | 276,000 | 316,000 | 310,000 | 280,000 |
| Total Nitrogen by Elementary Analysis (%) | 1.91 | 1.58 | 2.86 | 0.98 |

| | Ex. 5-5 | Ex. 5-6 | Ex. 5-7 |
| --- | --- | --- | --- |
| Copolymer in Ref. Ex. | Ref. Ex. 5-4 | Ref. Ex. 5-5 | Ref. Ex. 5-5 |
| Charged Amount (Parts) | 100 | 100 | 100 |
| Type of Maleimide Compound | Phenyl Maleimide | Cyclohexyl Maleimide | Phenyl Maleimide |
| Charged Amount (Parts) | 16 | 60 | 40 |
| Type of Vinyl Monomer | Methyl Methacrylate | Styrene 98 Acrylonitrile 42 | Methyl Methacrylate 10 |
| Charged Amount (Parts) | 4 | | |
| Polymerization Temperature (°C.) | 80 | 90 | 90 |
| Polymerization Time (hr) | 8 | 10 | 8 |
| Yield of Graft Copolymer (Parts) | 117 | 276 | 144 |
| Weight Average Molecular Weight of Graft Copolymer (GPC) | 145,000 | 140,000 | 118,000 |
| Total Nitrogen by Elementary Analysis (%) | 1.35 | 1.40 | 2.10 |

REFERENCE EXAMPLE 5-6

70 parts of polyvinyl chloride having a polymerization degree of 1,000 were mixed with 30 parts of the graft copolymer prepared in the Example 5-7 to produce a resin blend, to which were subsequently added 1.7 parts of tribasic lead sulfate, 1.8 parts of lead stearate and 0.5 part of calcium stearate. A molded material was then prepared under the roll condition of 180° C.×5 minutes and the press condition of 200° C. (5 minutes for preheating and 3 minutes for press working). A produced molded material was put to each test on physical properties as shown in Table 5-3. The results are shown in Table 5-3.

COMPARATIVE EXAMPLE 1

A molding material was prepared in the same way as in Reference Example 5-6, except using, as a blend resin, a resin composed of 10 parts of a copolymer with the weight average molecular weight of 180,000 previously prepared by suspension polymerization of 80 wt. % of phenyl maleimide and 20 wt. % of methyl methacrylate, and 90 parts of polyvinyl chloride with the polymerization degree of 1,000, and tested as to certain physical properties. The results are shown in Table 5-3.

TABLE 5-3

| | Ref. Ex. 5-6 | Comp. Ex. 1 |
| --- | --- | --- |
| Amount Used (in Parts) of Polyvinyl Chloride (Polym. Degree 1000) | 70 | 90 |
| Resin Blended in the Composition | Copolymer of Ex. 5-7 | Random Copolymer (wt. av. mol. wt., 180,000) Consisting of 80 wt. % of Phenyl Maleimide and 20 wt. % of Methyl Methacrylate |
| Composition Amount (Parts) | 30 | 10 |
| Physical Value | | |
| Fluidity (1) (mm$^3$ × 10$^{-3}$/Sec.) | 21 | 3 |
| Thermal Deform. Temp. (2) (°C.) | 87 | 78 |
| Izod Impact Value (3) (kg/cm$^2$) | 7.6 | 2.3 |

(1) JIS K-7210 (200° C., 200 kg/cm$^2$)
(2) JIS K-7207
(3) JIS K-7110

Although the present invention has been described with reference to the specific examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A maleimide random copolymer having a number average molecular weight of 1,700 to 530,000 comprising:

99.9 to 80 wt. % of a structural unit of a maleimide compound represented by the formula (I)

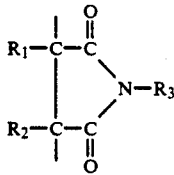 (I)

wherein $R_1$ and $R_2$ each stand for a hydrogen atom, a halogen atom or a methyl group and $R_3$ stands for an alkyl group having 1 to 18 carbon atoms, a halogen-substituted alkyl group having 1 to 18 carbon atoms, a cycloalkyl group, an aryl group or a substituted aryl group; and 0.1 to 20 wt. % of a structural unit of an unsaturated peroxycarbonate represented by the formula (II)

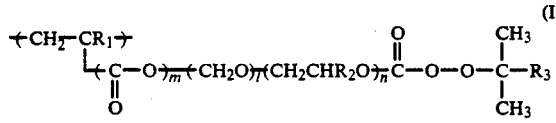 (II)

wherein $R_1$ and $R_2$ each stand for a hydrogen atom or a methyl group and $R_3$ stands for an alkyl group having 1 to 12 carbon atoms, a phenyl group, an alkyl-substituted phenyl group or a cycloalkyl group having 3 to 12 carbon atoms, m and l being 0 or 1, m+l=1 and n being an integer of 0 to 2.

2. A maleimide random copolymer having a weight average molecular weight of 2,000 to 600,000 comprising:

20 to 99 wt. % of a structural unit of a maleimide compound represented by the formula (I)

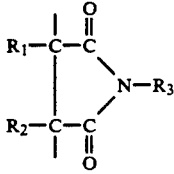 (I)

wherein $R_1$ and $R_2$ each stand for a hydrogen atom, a halogen atom or a methyl group and $R_3$ stands for an alkyl group having 1 to 18 carbon atoms, a halogen-substituted alkyl group having 1 to 18 carbon atoms, a cycloalkyl group, an aryl group or a substituted aryl group;

0.1 to 20 wt. % of a structural unit of an unsaturated peroxycarbonate represented by the formula (II)

 (II)

wherein $R_1$ and $R_2$ each stand for a hydrogen atom or a methyl group and $R_3$ stands for an alkyl group having 1 to 12 carbon atoms, a phenyl group, an alkyl-substituted phenyl group or a cycloalkyl group having 3 to 12 carbon atoms; m and l being 0 or 1, m+l=1 and n being an integer of 0 to 2; and 0.5 to 79 wt. % of a structural unit of a vinyl monomer represented by the formula (III)

 (III)

wherein $R_1$ stands for a hydrogen atom, a halogen atom or a methyl group and $R_2$ stands for an alkyl group, a phenyl group, an alkyl-substituted phenyl group, a halogen-substituted phenyl group, a chlorine atom, a nitrile group,

or —COOR$_4$, $R_3$ and $R_4$ each being an alkyl group having 1 to 18 carbon atoms.

3. The copolymer according to claim 1 or 2 wherein a maleimide compound monomer of the structural unit of the maleimide compound represented by the formula (I) is selected from the group consisting of N-methyl maleimide, N-ethyl maleimide, N-n-propyl maleimide, N-i-propyl maleimide, N-t-butyl maleimide, N-dodecyl maleimide, N-octadecyl maleimide, N-phenyl maleimide, N-o-methylphenyl maleimide, N-p-isopropyl phenyl maleimide, N-phenyl-α-methyl maleimide, N-phenyl-α-chloromaleimide, N-cyclohexyl maleimide, N-benzyl maleimide and mixtures thereof.

4. The copolymer according to claim 1 or 2 wherein a monomer of the structural unit of the unsaturated peroxycarbonate represented by the formula (II) is selected from the group consisting of t-butylperoxyallyl carbonate, t-hexylperoxyallyl carbonate, 1,1,3,3-tetramethylbutylperoxyallyl carbonate, p-menthaneperoxyallyl carbonate, cumylperoxyallyl carbonate, t-butylperoxymethallyl carbonate, t-butylperoxyacryloyloxyethyl carbonate, t-hexylperoxyacryloyloxyethyl carbonate, t-hexylperoxymethacryloyloxyethyl carbonate, cumylperoxyacryloyloxyethyl carbonate, p-isopropylcumylperoxyacryloyloxyethyl carbonate, t-butylperoxymethacryloyloxyethyl carbonate, t-butylperoxymethacryloyloxyethyl carbonate, t-amylperoxyacryloyloxyethyl carbonate, t-amylperoxymethacryloyloxyethyl carbonate, cumylperoxymethacryloyloxyethyl carbonate, t-butylperoxyacryloyloxyethoxyethyl carbonate, t-hexylperoxyacryloyloxyethoxyethyl carbonate and mixtures thereof.

5. The copolymer according to claim 2 wherein a monomer of the structural unit of the vinyl monomer represented by the formula (III) is selected from the group consisting of styrene, o-methylstyrene, p-methylstyrene, o-chlorostyrene, p-bromostyrene, p-methoxystyrene, α-methylstyrene, acrylic acid, ethyl acrylate, n-butyl acrylate, phenyl acrylate, cyclohexyl acrylate, methacrylic acid, methyl methacrylate, ethyl methacrylate, n-butyl methacrylate, 2-ethylhexyl methacrylate, vinyl acetate, vinyl propionate, vinyl stearate, vinyl benzoate, vinyl chloride, acrylonitrile, methacrylonitrile, vinylidene chloride, butadiene, propylene, isoprene, ethylene, propionic acid and mixtures thereof.

* * * * *